United States Patent
Chen et al.

(10) Patent No.: US 11,790,324 B2
(45) Date of Patent: Oct. 17, 2023

(54) ELECTRONIC FOCUS SESSIONS

(71) Applicant: Microsoft Technology Licensing, LLC, Redmond, WA (US)

(72) Inventors: Liang Chen, Sammamish, WA (US); Rian Keith McCormack, Seattle, WA (US); Herrick Heath Spencer, Woodinville, WA (US); Eric Hwa-Wei Wong, Bellevue, WA (US); David Grochocki, Jr., Seattle, WA (US); Marcus Henry Perryman, Wimborne (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 163 days.

(21) Appl. No.: 17/331,367

(22) Filed: May 26, 2021

(65) Prior Publication Data

US 2022/0385753 A1 Dec. 1, 2022

(51) Int. Cl.
*G06F 3/0482* (2013.01)
*G06Q 10/109* (2023.01)
(Continued)

(52) U.S. Cl.
CPC ......... *G06Q 10/109* (2013.01); *G06F 3/0482* (2013.01); *G06F 3/165* (2013.01);
(Continued)

(58) Field of Classification Search
CPC .......... G06Q 10/109; G06Q 10/063114; G06F 3/0482; G06F 3/165; H04M 1/72409;
(Continued)

(56) References Cited

U.S. PATENT DOCUMENTS

| 2008/0086318 A1* | 4/2008 | Gilley | G16H 10/20 705/319 |
| 2010/0062905 A1* | 3/2010 | Rottier | H04M 1/72403 482/9 |

(Continued)

OTHER PUBLICATIONS

Clockwork Tomato presentation by Dev Phlam published Apr. 29, 2016 . pp. 1-9 (Year: 2016).*

(Continued)

*Primary Examiner* — Hien L Duong

(57) ABSTRACT

In non-limiting examples of the present disclosure, systems, methods and devices for initiating and managing electronic focus sessions are provided. A focus session window may be displayed. The focus session window may comprise a timer pane comprising a focus session duration input element; a task pane comprising an identity of at least one task object created by a task management application; a music pane comprising an identity of at least one music playlist; and/or a daily progress pane that includes a goal display element indicating a duration of time spent in focus sessions for a current day. An indication to initiate a focus session may be received. The initiating may comprise causing a timer for the duration of time to be initiated and displayed in the timer pane and causing one of the music playlists to be automatically played.

20 Claims, 16 Drawing Sheets

(51) Int. Cl.
*H04M 1/72409* (2021.01)
*H04M 1/72451* (2021.01)
*H04M 1/72463* (2021.01)
*G06F 3/16* (2006.01)
*G06Q 10/0631* (2023.01)
*H04M 1/72442* (2021.01)

(52) U.S. Cl.
CPC ............. *G06Q 10/063114* (2013.01); *H04M 1/72409* (2021.01); *H04M 1/72451* (2021.01); *H04M 1/72463* (2021.01); *H04M 1/72442* (2021.01); *H04M 1/724631* (2022.02)

(58) Field of Classification Search
CPC ......... H04M 1/72451; H04M 1/72463; H04M 1/72442; H04M 1/724631
See application file for complete search history.

(56) References Cited

U.S. PATENT DOCUMENTS

| | | | | |
|---|---|---|---|---|
| 2014/0344693 | A1* | 11/2014 | Reese | G06F 3/04847 715/739 |
| 2015/0121386 | A1* | 4/2015 | Marseille | G06Q 10/109 718/103 |
| 2015/0185967 | A1* | 7/2015 | Ly | G06F 3/0488 715/720 |
| 2017/0236100 | A1* | 8/2017 | Bayat | G06Q 10/20 705/305 |
| 2017/0243508 | A1* | 8/2017 | Cheng | G09B 5/02 |
| 2017/0329933 | A1* | 11/2017 | Brust | G06F 16/24575 |
| 2018/0240140 | A1* | 8/2018 | Whitley | G06Q 50/22 |
| 2018/0278998 | A1* | 9/2018 | Nishiura | H04N 21/4586 |
| 2019/0043622 | A1* | 2/2019 | Ramaci | G06F 1/163 |
| 2019/0205839 | A1* | 7/2019 | Dotan-Cohen | H04L 67/535 |
| 2019/0213519 | A1* | 7/2019 | Metz | G06F 1/1684 |
| 2020/0402020 | A1* | 12/2020 | Bergen | G06Q 10/1095 |
| 2021/0252341 | A1* | 8/2021 | Devine | G06F 3/0481 |
| 2021/0255826 | A1* | 8/2021 | Devine | H04W 12/55 |
| 2021/0303618 | A1* | 9/2021 | Sheehan | G06F 16/639 |
| 2022/0374808 | A1* | 11/2022 | Robinson | G09B 19/003 |

OTHER PUBLICATIONS

"Focus to do" by Super Element, Microsoft App Store, publication Nov. 1, 2017. pp. 1-4 (Year: 2017).*

* cited by examiner

ELECTRONIC FOCUS SESSIONS

BACKGROUND

The modern workday is filled with electronic distractions that can make it difficult to be productive and keep track of tasks that need to be completed. The challenge comes from multiple fronts, including distractions from desktop and mobile computing devices. For example, users receive electronic notifications (e.g., emails, group chat messages, news updates) on their desktops, making it difficult to concentrate on the primary device they work on, while at the same time receiving electronic notifications (e.g., text messages, social media updates) on their mobile devices, which are often kept within eye contact at work. This barrage of electronic notifications makes it difficult to identify tasks that need to be completed, find uninterrupted time to complete those tasks, and reflect on those tasks once they are completed.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for scheduling, initiating and managing electronic focus sessions. According to a first example, a computer-readable storage device is provided. The computer-readable storage device comprises executable instructions that, when executed by a processor, assists with managing a focus session, the computer-readable storage device including instructions executable by the processor for: causing a focus session window to be displayed, wherein the displayed focus session window comprises: a timer pane comprising a focus session duration input element, a task pane comprising an identity of at least one task object created by a task management application, and a music pane comprising an identity of at least one music playlist; receiving an input, at the focus session duration input element, of a duration of time; receiving an indication to initiate a focus session; and initiating the focus session based on the received indication, the initiating comprising: causing a timer for the duration of time to be initiated and displayed in the timer pane, and causing one of the music playlists to be automatically played.

According to an additional example, a system is provided. The system comprises: a memory for storing executable program code; and a processor, functionally coupled to the memory, the processor being responsive to computer-executable instructions contained in the program code and operative to: maintain an electronic calendar object comprising: a date, a start time and duration of time on the date, and a focus session designation; determine that a current time is the start time; initiate, based on determining that the current time is the start time, a focus session, wherein initiating the focus session comprises: causing a focus session window to be displayed, wherein the displayed focus session window comprises: a timer pane, a task pane comprising an identity of at least one task object created by a task management application, and a music pane comprising an identity of at least one music playlist; causing a timer for the duration of time to be initiated and displayed in the timer pane; and causing one of the music playlists to be automatically played.

In another example, a computer-implemented method is provided. The computer-implemented method comprises: executing a task management software application; displaying, in the task management software application, an identity of a task object; receiving, in the task management software application, an indication to work on a task corresponding to the task object in a focus session; automatically causing a focus session window to be displayed based on receiving the indication, wherein the displayed focus session window comprises: a timer pane, and a music pane comprising an identity of at least one music playlist; initiating the focus session, wherein initiating the focus session comprises: causing a timer for a specified duration of time to be initiated and displayed in the timer pane, and causing one of the music playlists to be automatically played; and automatically associating the task object with the focus session.

BRIEF DESCRIPTION OF THE DRAWINGS

Non-limiting and non-exhaustive examples are described with reference to the following figures.

DETAILED DESCRIPTION

Figure 1:
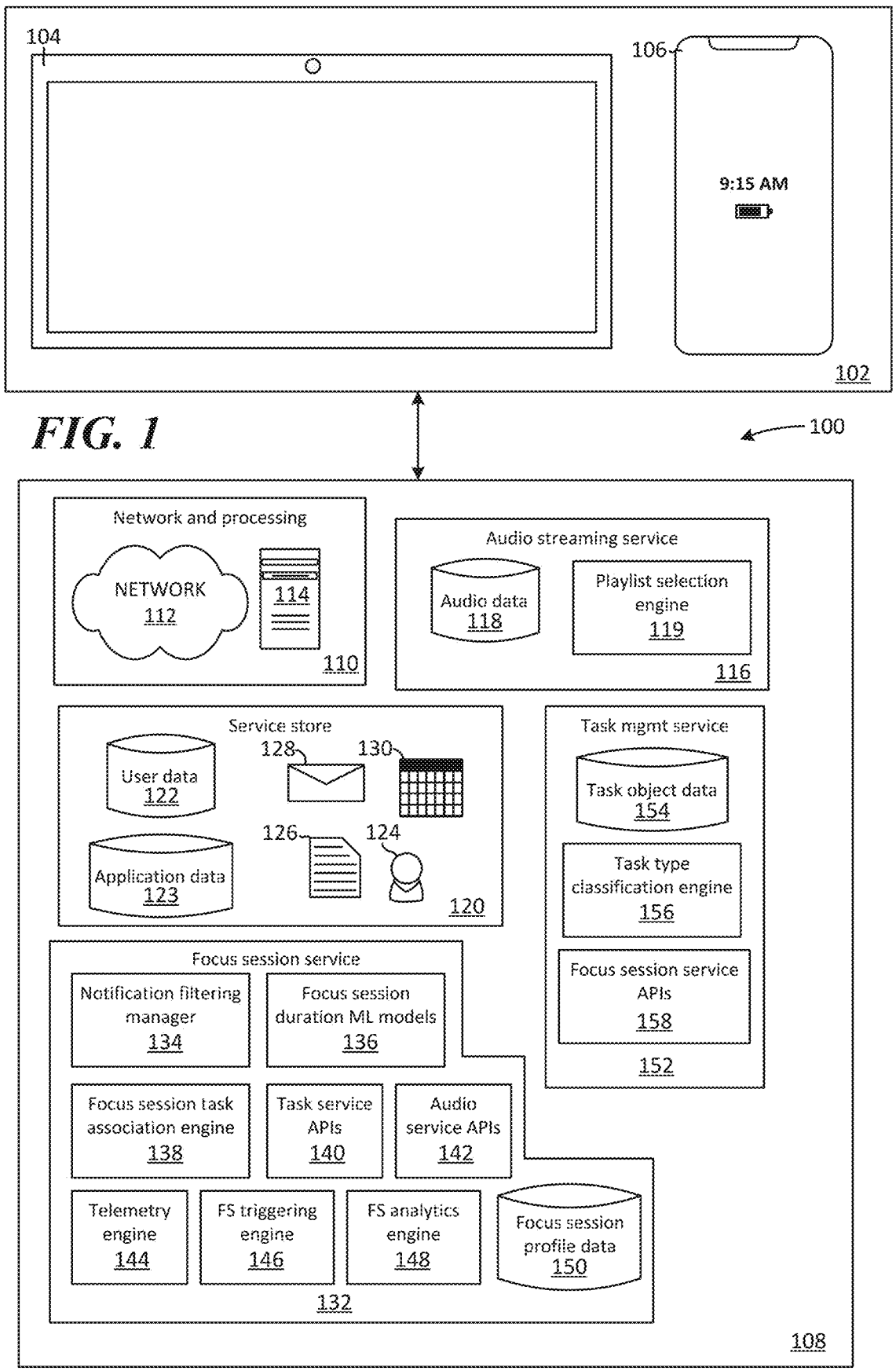
FIG. 1 is a schematic diagram illustrating an example distributed computing environment for generating and managing focus sessions.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Non-limiting examples of the present disclosure describe systems, methods and devices for scheduling, initiating and managing electronic focus sessions. One or more computing devices may initiate an electronic focus session (sometimes referred to herein as simply a "focus session") to enhance a user's productivity for the duration of the focus session. A focus session may be initiated via various mechanisms. For example, a focus session may be initiated via a focus session setup window or from a different application or service (e.g., an electronic calendar application or service, a task management application or service, an electronic communications application or service, a web browser application or service, an operating system-based application or service, a word processing application or service, a spreadsheet application or service, a presentation application or service, a content creation application or service).

Once a focus session is initiated, a focus session window may be displayed. The focus session window may comprise a timer pane, a task pane that includes an identity of at least one task object that may be associated with a focus session, a music pane that includes an identity of at least one music playlist that may be played during a focus session, and/or a daily progress pane that includes a goal display element indicating a duration of time spent in focus sessions for a current day in relation to a focus session time goal for the current day. A user may set a duration of time that a focus session will be active for, and one or more breaks may be inserted into the focus session based on the set duration of the focus session. When a focus session is active, a timer element in the timer pane may display a countdown of the time remaining in the focus session. The timer element may be maintained at the foreground of the user interface even if the focus session window is minimized or caused to be positioned at a lower position in a z-order of the user interface.

In some examples, electronic notifications received by the computing device that the focus session is initiated on may be selectively blocked during the duration of the focus session based on data such as the sender of the electronic notifications, the content of the electronic notifications, and/or the identity of the application of origination of an electronic notification. In additional examples, electronic notifications received by a device (e.g., smart phone, tablet) that is connected to the computing device that the focus session is initiated on may be selectively blocked (e.g., blocked from being surfaced on the connected device, blocked from being surfaced during the duration of the focus session on the device the focus session is active on) from being surfaced.

The systems, methods and devices described herein provide technical advantages for assisting with electronic task management. In some examples, machine learning models for identifying durations of time that users need to be uninterrupted by electronic notifications to be productive and complete tasks may be trained and updated via mechanisms described herein. For example, application data associated with focus sessions may be collected and utilized to determine whether users become distracted after a threshold duration of time. That data can be processed to train and update the machine learning models that are utilized to schedule focus sessions and determine where breaks should be inserted in focus sessions, as well as how long those breaks should be. Additional machine learning models may be trained and improved for identifying durations of time that tasks of specific task types take to complete during focus sessions based on the of processing of application data for focus sessions that are manually or automatically associated with task objects. Models may also be trained and improved for selecting music and playlists for playing during focus sessions based on the processing of application data from focus sessions and/or explicit feedback from users indicating productivity or lack of productivity when listening to specific music or playlists. Task management applications and services are also improved via the systems, methods and devices described herein. Task objects may be associated with new data and/or data fields based on the association of task objects with focus sessions. For example, task objects may be tagged or otherwise associated with durations of time that tasks of the task object type take to complete during focus sessions. That data may be utilized to intelligently schedule focus sessions for completing tasks via electronic calendar applications and/or a focus session service. User interfaces that display summary focus session data and insights that may be interacted with for causing automated actions to be performed are also described herein. These user interfaces provide mechanisms for intelligently modifying task object data via interaction with user interface elements and associating task objects with intelligently identified focus session times and durations.

FIG. 1 is a schematic diagram illustrating an example distributed computing environment 100 for generating and managing focus sessions. Distributed computing environment 100 includes local device sub-environment 102 and application service sub-environment 108. Local device sub-environment 100 includes client computing device 104 and mobile computing device 106. Application service sub-environment 108 includes network and processing sub-environment 110, audio streaming service 116, task management service 152, service store 120, and focus session service 132.

Network and processing sub-environment 110 includes network 112 and server computing device 114, via which any and all of the computing devices described herein may communicate with one another. Server computing device 114 is illustrative of one or more server computing devices that may host focus session service 132, audio streaming service 116, task management service 152, and/or service store 120. Although focus session service 132, audio streaming service 116, task management service 152, and service store 120 are illustrated as being included in application service sub-environment 108, it should be understood that one or more components of those services (e.g., managers, models, engines, application programming interfaces [APIs], saved data) may be stored on and/or executed by one of the local computing devices (e.g., client computing device 104, mobile computing device 106). Similarly, the local computing devices may execute applications associated with one or more of focus session service 132, audio streaming service 116, task management service 152, and service store 120.

Service store sub-environment 120 may include information associated with focus session service 132, audio streaming service 116, task management service 152, and/or one or more other applications or services. For example, service store sub-environment 120 may include application interaction data, contact interaction data, and/or organizational hierarchy data for one or more user accounts. The application interaction data may include a number of inputs received by one or more applications by user accounts, amount of time actively using one or more applications by user accounts, times of day and/or days of the week that user accounts utilize applications, identities of contacts communicated with utilizing applications, user and/or device location while utilizing one or more applications, and/or what activity (e.g., walking, talking, driving, meeting) a user is engaging in while utilizing one or more applications. The aggregate information for a plurality of users associated with a productivity application suite and/or one or more other applications may be included in application data store 123. User data (e.g., account identifiers, user preferences, passwords) may be stored in user data store 122. In some examples, user data store 122 and application data store 123 may be comprised in a same data store.

User data store 122 may be associated with a plurality of user accounts, such as user account 124. User account 124 may have granted focus session service 132 with access to the user's application data. User account 124 may additionally or alternatively be associated with one or more productivity application services. In this example, user account 124 is associated with an email application service, a word processing application service, and a calendar application service. As such, service store 120 includes electronic messages 128 associated with user account 124, electronic documents 126 associated with user account 124, and electronic calendar information 130 associated with user account 124. User data store 122 may include additional information from one or more other applications or services, such as SMS messaging applications or services, group messaging/collaboration applications or services, social media applications or services, web browser applications or services, task management applications or services, to-do list applications or services, map applications or services, reservation applications or services, presentation applications or services, and spreadsheet applications or services, for example. In some examples, user data store 122 may include information for user accounts associated with focus session service 132, task management service 152, and/or audio streaming service 116.

Audio streaming service 116 includes audio data store 118 and playlist selection engine 119. Audio data 118 may include audio files (e.g., song files, podcast files, audio playlist files) that may be identified and sent to, or retrieved by, computing devices (e.g., client computing device 104, mobile computing device 106) via execution of one or more APIs and one or more uniform resource identifiers (URIs) or uniform resource locators (URLs). For example, client computing device 104 and/or mobile computing device 106 may utilize one or more audio service APIs 142 associated with focus session service 132 for communicating URIs and/or URLs to audio streaming service 116 for identifying audio data for playing during a focus session.

Playlist selection engine 119 may comprise one or more rules, algorithms, and/or machine learning models for selecting audio files for use in focus session playlists, or for selecting entire playlists for use in focus sessions. In some examples, the rules, algorithms, and/or machine learning models may be updated and/or trained based on user feedback indicating one or more focus session playlists, or audio files included in a focus session playlist, were appropriate or inappropriate for listening to during a focus session. In additional examples, the rules, algorithms, and/or machine learning models may be updated and/or trained based on the receiving of automatically collected application data that indicates that one or more focus session playlists, or audio files included in a focus session playlist, were helpful in producing a productive focus session. For example, application data collected from one or more applications for users during focus sessions may indicate that users were less distracted (e.g., less use of social media applications or browsing non-task related websites, more tasks completed) while listening to some audio files, and more distracted (e.g., more time spent using social media applications or browsing non-task related websites, fewer tasks completed) while listening to other audio files.

Task management service 152 includes task object data 154, task type classification engine 156, and focus session service APIs 158. Task management service 152 may comprise a service associated with one or more applications for assisting with task management and execution. For example, task management service 152 may include the identities of tasks that users have added to an electronic to-do list, applications associated with the completion of tasks, electronic calendar entries and/or due dates associated with tasks, and task type classifications of tasks.

When users create a task via task management service 152, or an associated application, a task object may be written to an electronic task fabric associated with an account for the user. That is, each user account associated with task management service 152 may include an electronic task fabric comprised of one or more task objects. The electronic task fabrics and included task objects may be stored in task object data store 154. In examples, a task object may comprise one or more of a task name, a task type, an estimated duration of time to complete, applications used while working on the specific task object or task objects of the task type, duration of focus session time spent on a task object, files accessed while working on a task object or task objects of the task type, and/or an identifiers of one or more user accounts associated with a task object. In other examples, task objects for a user account may be stored separately (e.g., not in an electronic task fabric).

Task type classification engine 156 may classify task objects into task types based on manual user input and/or automated analysis of application data associated with a task. Non-limiting examples of task types that task objects may be classified into include work type, personal type, compose email type, draft electronic document type, draft electronic document for a project of a specific classification type, review data type, and review electronic document type. Users may also associate custom task type classifications with task objects. Users may manually associate task types with task objects via input fields or tagging mechanisms accessed via task management service 152, focus session service 132 or one or more applications that a task object is being worked on in. Automated analysis of application data for classifying task objects into task types may comprise applying one or more natural language processing models to textual content associated with one or more task objects. The one or more natural language processing models may have been trained to classify text into one or more task type categories. In some examples, the one or more natural language processing models may comprise keyword or phrase matching models. In other examples, the one or more natural language processing models may comprise vector embedding models. Examples of vector embedding models include that may be utilized include but are not limited to Bidirectional Encoder Representations from Transformers (BERT) and Embeddings from Language Models (ELMo).

Focus session service APIs 158 may comprise one or more APIs that provide task management service 152 access to focus session service 132, or a focus session application executed on client computing device 104 or mobile computing device 106. For example, focus session service APIs 158 may be initiated via task management service 152, or a task management application executed on client computing device 104 or mobile computing device 106, to associate one or more tasks with a focus session, and initiate the focus session for completing the one or more tasks. In some examples, focus session service APIs 158 may initiate the automatic launching of one or more application windows and/or files in one or more application windows for working on a task object based on a task type associated with the task object. For example, task management service 152 or focus session service 132 may analyze application data from users that work on a specific task type and determined to a threshold degree of accuracy that a user that initiates a focus session to work on a task object of that specific type is likely to utilize one or more application types to complete the task. Thus, when a focus session that is associated with that specific task type is initiated, focus session service 132 and/or task management service 152 may cause one or more application windows corresponding to those one or more application types to be automatically launched, or suggested to be launched. In additional examples, task management service 152 and/or focus session service 132 may determine that a user previously worked on a task object by accessing a specific file, and when that task object is associated with a focus session that has been initiated, the specific file may be automatically opened, or suggested to be opened.

Focus session service 132 includes notification filtering manager 134, focus session duration machine learning models 136, focus session task association engine 138, task service APIs 140, audio service APIs 142, telemetry engine 144, focus session triggering engine 146, focus session analytics engine 148, and focus session profile data 150. One or more managers, models, engines, and/or APIs included illustrated and described in relation to focus session service 132 may be stored on and/or executed by a local computing device (e.g., by client computing device 104, by mobile computing device 106). Focus session service 132 and/or a focus session application executed by a local computing device (e.g., client computing device 104, mobile computing device 106) may perform operations associated with assisting with managing focus sessions. In some examples, those operations may comprise causing a focus session window to be displayed, wherein the displayed focus session window comprises: a timer pane comprising a focus session duration input element, a task pane comprising an identity of at least one task object created by a task management application, and a music pane comprising an identity of at least one music playlist; receiving an input, at the focus session duration input element, of a duration of time; receiving an indication to initiate a focus session; and initiating the focus session based on the received indication, the initiating comprising: causing a timer for the duration of time to be initiated and displayed in the timer pane, and causing one of the music playlists to be automatically played.

Focus session service 132 may maintain focus session profiles for focus session users in focus session profile data store 150. In some examples, a focus session profile may comprise an identity (e.g., user account login information, user identifier) of a focus session user, identities of tasks worked on during focus sessions, durations of time spent in focus sessions, focus session goals, and/or focus session settings. The focus session goals may comprise daily, weekly, and/or monthly durations of time that a user would like to spend in focus sessions. In additional examples the focus session goals may comprise daily, weekly, and/or monthly numbers or types of tasks that users would like to work on or complete while in focus sessions. In some examples, the focus session window that is caused to be displayed by focus session service 132 and/or a focus session service application may further comprise a daily progress pane that includes a goal display element indicating a duration of time spent in focus sessions for a current day in relation to the focus session time goal for a current day.

Notification filtering manager 134 may monitor electronic notifications received by one or more computing devices (e.g., client computing device 104, mobile computing device 106) associated with a user account, and filter those electronic notifications to intelligently determine which electronic notifications to surface based on a user (e.g., a user's computing device) currently being in a focus session. In examples, notification filtering manager 134 may receive an electronic notification from a first application; determine, based on at least one of: the content of the electronic notification, a sender of the electronic notification, and an identity of the first application, an electronic notification priority score for the electronic notification; determine that the electronic notification priority score for the electronic notification is below a threshold value; and block the electronic notification from being surfaced during the focus session. In some examples, a user's phone or tablet (e.g., mobile computing device 106) may be in wired or wireless connection with the user's primary computing device (e.g., client computing device 104) and the primary computing device may receive notifications from one or more applications or services executed by the user's phone or tablet, which may be filtered by notification filtering manager 134. In other examples, notifications filtered by notification filtering manager 134 may be received directly by the user's primary computing device and not first be received by the user's phone or tablet.

If an electronic notification is received by one or more devices (e.g., client computing device 104, mobile computing device 106) associated with a user account, notification filtering manager 134 may determine an application priority score for the application from which the notification was sent and/or received. Notification filtering manager 134 may further determine a notification priority score for the electronic notification. Notification filtering manager 134 may then process and/or apply one or more functions to the application priority score for the application and the notification priority score for the electronic notification and make a determination as to a combined priority score for the electronic notification. If the combined priority score meets or exceeds a threshold value, notification filtering manager 134 may cause the electronic notification to be surfaced. However, if the combined priority score does not meet or exceed the threshold value (e.g., the combined priority score is below the threshold value), notification filtering manager 134 may cause the electronic notification to be blocked. Blocked notifications may be kept in a hidden list that may be accessed by a user at any time to determine what notifications have been blocked while a focus session is active.

In some examples, the focus session application priority scores for an application may be pre-calculated prior to a new notification being received and those values may be updated over time based on user interactions. In additional examples, focus session application priority scores for an application may have default values assigned to them based on telemetry data (e.g., telemetry data collected and/or analyzed by telemetry engine 144) for a plurality of users of focus session service 132, and those default scores may be modified for specific user accounts over time based on the specific user accounts' interactions with the application.

Thus, an application priority score for an application (A) for a focus session (F) may be determined by notification filtering manager 134. This may be mathematically represented as P(A|F). Focus session service 132 may calculate these values by normalizing the user inputs (e.g., clicks) and interactions to a certain application's notifications with the total number of inputs/interactions of the different applications' notifications by the user along with signal weights from user data store 122 and/or application data store 123.

Notification filtering manager 134 may perform operations associated with determining a notification priority score for an electronic message. In examples, the notification priority score may be determined from a contact importance score and/or a content importance score.

A contact importance score may be determined based on determining an identity of a user account associated with an electronic notification. The user account may be a sender of a message corresponding to an electronic notification, a user account included as a recipient of a multi-user electronic message (e.g., a user included in the "to" field of an email, a user included in the "cc" field of an email), or the publisher of electronic content corresponding to an electronic notification (e.g., user that posted social media update corresponding to electronic notification). In examples, users accounts that have a higher frequency of communication with one another may have higher contact importance scores associated with them. In additional examples, users accounts that are determined to be associated with a same group (e.g., family account, work account, work organization) may have higher contact importance scores associated with them than user accounts that are not associated with a same group. In still additional examples, user accounts that are determined to be higher up in an organizational hierarchy, based on an organizational chart, may have higher contact importance scores associated with them than user accounts that are lower down in an organizational hierarchy.

A content importance score may be determined based on extraction of content (e.g., a message, a post) associated with an electronic notification and processing of that content. In examples, one or more natural language processing models may be applied to the content to determine a content importance score for content associated with an electronic notification. Natural language processing models may comprise a keyword and/or key phrase matching model that matches the content associated with an electronic notification to one or more important or unimportant keywords or phrases. In additional examples, a keyword and/or key phrase matching model may match keywords or phrases from the content to keywords or phrases that are known spam words or phrases. In other examples, natural language processing models may comprise a word, string, sentence, and/or document (e.g., entire content of notification/message) embedding model. Thus, one or more embeddings may be generated for text associated with an electronic message, and similarity scores between those embeddings and one or more previously embedded words, strings, sentences, and/or documents may be determined. Thus, a determination may be made based on the similarity scores as to whether a newly generated embedding related to a new electronic notification is similar to previously generated embeddings that were classified as being important, unimportant, and/or relating to spam, for example. The embedding models that may be utilized may include one or more of: a BERT model, an ELMo model, a recurrent neural network model, a long short-term memory (LSTM) model, and/or a gated recurrent units (GRU) model. In some examples a nearest neighbor model may be utilized to determine similarity scores between embeddings.

In a specific example, raw notification content ($\hat{D}$) from an application/notification may be passed as a string data structure into a pre-processing phase. During pre-processing, notification filtering manager 134 may remove unnecessary punctuation marks and unsupported non-unicode characters, convert the string to lowercase letters, and/or apply a word tokenizer. The result of the pre-processing phase may be a list of words ($\tilde{D}$) from the input notification content. Notification filtering manager 134 may maintain a list of stop words (S) which do not add any semantic value to the notification content, block words (B) which are most common words in spam notifications, and words of importance (I) which add a sense of urgency to the notification content. The stop words may be filtered from ($\tilde{D}$) to get $\tilde{D}_s$. This information may then be utilized to calculate the content importance score of the electronic notification. In examples, any block words (B) that were identified in the content associated with the electronic notification may cause the content importance score to be reduced, and any important words (I) that were identified in the content associated with the electronic notification may cause the content importance score to be increased. The normalized sum of word probabilities from $\tilde{D}_s$ may be calculated to arrive at the content importance score for an electronic notification:

$$P(D) = P(\tilde{D}_S) = \frac{\sum_{i}^{N} P(w_i)}{N},$$

where $w_i \in \tilde{D}_S$ and $P(w_i)$ is word priority score

In examples, the content importance score and/or the contact importance score may be processed to determine the notification priority score for an electronic notification. The processing may comprise summing the scores, applying one or more weighted functions to the scores, and/or processing the scores with a neural network that has been trained to classify notification importance, for example.

Upon determining an application priority score for a focus session and a particular application from which an electronic notification was sent and/or received and determining a notification priority score for the electronic notification, notification filtering manager 134 may determine a combined priority score for the electronic notification. In some examples, the combined priority score may be determined by calculating a weighted or non-weighted sum of the notification priority score and the application priority score. An activation function (e.g., softmax, sigmoid) may be applied to the sum to determine whether the combined priority score meets a threshold value for surfacing the notification.

As a specific example, the priority of a notification given a user's focus session state P(N|F) may be calculated as the weighted sum of P(A|F) and P(D):

$$P(N|F) = \omega_{A_f} \times P(A|F) + \omega_D \times P(D)$$

An activation function (ƒ) may then be utilized as a decision threshold for priority:

$$f(P(N|F)) \Rightarrow (\text{Priority Notification}, \text{Not a priority})$$

The algorithm may evolve with user patterns and updates to the database (e.g., focus session profile data store 150, user data store 122, application data store 123) with user preferences to recommend with higher confidence upon usage.

Focus session machine learning models 136 may comprise statistical machine learning models, vector embedding models, and/or neural networks that have been trained to determine durations of time that users in general, users of specific types, and/or specific users are most productive in focus sessions for. Those durations of time may be utilized to identify, by focus session service 132, one or more electronic calendar events or open electronic calendar durations for scheduling a focus session. Those durations of time may also be utilized to determine whether breaks should be included in a focus session for a user, and if so, how long the breaks should be. Focus session duration machine learning models 136 may receive application data from one or more applications that users utilize during a focus session and update one or more of the machine learning models based on how productive a user was based on that application data. For example, if application data indicates that a user utilized a social networking or other non-task related application or service after a specific duration of time in one or more focus sessions, that may indicate that the user needs a break prior to that duration of time being reached, and/or that may indicate that focus sessions should be shorter for that user or users of a same or similar demographic or organizational type. One or more values (e.g., values in nodes of a neural network) in a machine learning model may thus be updated based on the application data associated with focus sessions.

Focus session task association engine 138 may associate one or more task objects with a focus session. In examples, focus session task association engine 138 may communicate with task management service 152 (e.g., via task service APIs 140) in associating a task object with a focus session. In some examples, focus session task association engine 138 may determine that a selection of an identity of a task object has been made from the task pane of a focus session window, associate a task object corresponding to the selected identity with the focus session, and store the duration of time corresponding to the focus session in a task fabric that includes the task object (e.g., via communication with task management service 152).

Focus session triggering engine 146 may receive a manual indication from a user that a user would like to initiate a focus session and cause a focus session to be initiated. For example, a user may input a duration of time that a user would like to initiate a focus session for and cause a focus session to be initiated for that duration of time based on a received command from the user (e.g., an input to an initiation button, a voice command). In other examples, one or more electronic calendar events in a user's electronic calendar may have been tagged or otherwise associated as focus session events and focus session triggering engine 146 may cause a focus session to be automatically initiated on a computing device (e.g., client computing device 104, mobile computing device 106) based on determining that the start time for that calendar event has occurred. In additional examples, focus session triggering engine 146 may trigger the initiation of a focus session based on receiving an indication to start the focus session from task management service 152 or a task management application.

Focus session analytics engine 148 may process focus session data, task object data associated with focus sessions, and/or application data associated with focus sessions, and generate insights and recommendations that may be surfaced on computing devices. The insights and recommendations may be interactable for causing various actions to be automatically executed. For example, a first insight or recommendation may suggest to a user that the user consolidate the user's focus sessions when a determination is made that there have been multiple disconnected short focus sessions. The insight may be interactable for automatically consolidating electronic calendar events that have been tagged or otherwise associated with focus sessions. Other insights may include identifying and surfacing audio playlists that are the correct length, or that are determined to be better for focusing or working on specific tasks. Those insights may be selectable for associating a corresponding playlist with a future focus session and/or one or more task objects that may be associated with a future focus session.

Focus session analytics engine 148 may generate and cause the surfacing of daily and weekly focus session summaries, which may provide a way for users to review and reflect on the tasks they have worked on and completed during focus sessions, as well as review and reflect on focus sessions that were not specifically associated with task objects. A focus session summary may indicate what users have achieved in a day, including daily focus goals, total focus time for a day, number of tasks completed in a day, and a streak of a number of days when a user initiated and/or completed a focus session or met focus session goals. A focus session summary may include a list of tasks that were worked on during focus sessions. In some examples, durations of time that were spent on one or more tasks during one or more focus sessions may be graphically illustrated in a focus session summary. These graphical illustrations may offer users a quick way to see how long they were able to focus on tasks and whether their time working on a task was interrupted. The information may help users think about ways to improve their productivity in the future. Additionally, by interacting with the insights and recommendations (e.g., selecting intelligently identified playlists for association with future focus sessions, causing shorter focus sessions to be combined), users may improve their efficiency of working on tasks during focus sessions.

Figure 2:
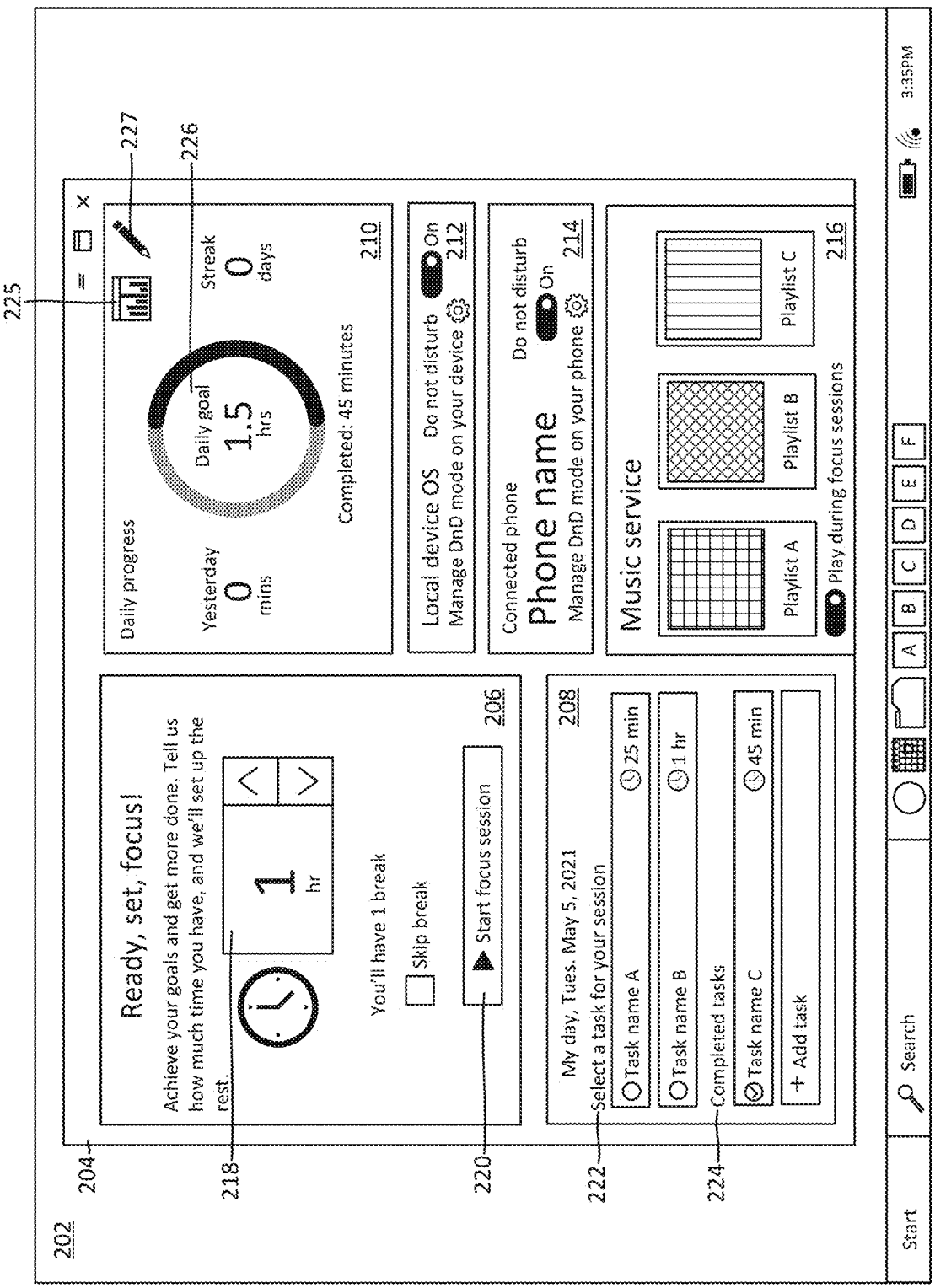
FIG. 2 illustrates an exemplary user interface displaying a focus session setup window.

FIG. 2 illustrates an exemplary user interface 202 displaying a focus session setup window 204. Although the window illustrated in FIG. 2 is described primarily as a "focus session setup window" because it is utilized to setup a focus session, it may also be referred to as a "focus session window". The user interface 202 may be displayed on a computing device such as client computing device 104 or mobile computing device 106. Focus session setup window 204 includes timer pane 206, task pane 208, daily progress pane 210, music pane 216, local notification filtering pane 212, and connected device notification filtering pane 214.

Timer pane 206 includes focus session duration input element 218 and focus session initiation element 220. Timer pane 206 also includes the text "Ready, set focus! Achieve your goals and get more done. Tell us how much time you have, and we'll set up the rest." Focus session duration input element 218 may be interacted with for setting the duration of time for an upcoming focus session. For example, a user may interact with the up arrow of duration input element 218 to add time (e.g., minutes, hours) to the duration of an upcoming focus session that is being scheduled, or the down arrow of duration input element 218 to lessen time from the duration of an upcoming focus session that is being scheduled. In other examples, a user may set a duration of time for an upcoming focus session utilizing duration input element 218 by inserting a typed input into duration input element 218. In still other examples, a spoken input of a duration of time may be received by a computing device executing user interface 202, the spoken input may be processed by a natural language processing engine executed on the local computing device or in the cloud, and a determined duration of time from that natural language input may be input in duration input element 218. In this example, focus session duration input element 218 has been set for one hour.

Timer pane 206 also includes the text "You'll have 1 break" indicating that one break will be included in the focus session that has been scheduled for one hour. In some examples, the time in the focus session where the break is scheduled and/or the duration of the break may be intelligently identified via focus session duration machine learning models 136. For example, focus session duration machine learning models 136 may have determined that the user associated with focus session setup window 204 needs a break every X minutes to be most productive, or that the user associated with focus session setup window 204 needs breaks of Y minutes in duration to be most productive. This may have been determined based on the processing of application data from one or more previous focus sessions for the user by machine learning models 136, and/or from direct feedback provided by the user.

Task pane 208 includes first text "My day, Tues. May 5, 2021". Below that first text are the identities 222 of a plurality of task objects (e.g., task objects created by a task management application or service) under the heading "select a task for your session". Each of the identities 222 of the plurality of task objects may be interacted with for associating the corresponding task object with the focus session that is being scheduled. Each of those identities 222 also includes a task name for a corresponding task object, and an estimated duration of time that the corresponding task object has been determined to take to complete. For example, a first identity of the plurality of task objects states "Task name A" (e.g., the name of the task) and "25 minutes" (e.g., the estimated duration of time that the corresponding task object has been determined to take to complete), and a second identity of the plurality of task objects states "Task name B" (e.g., the name of the task) and "1 hr" (e.g., the estimated duration of time that the corresponding task object has been determined to take to complete. In some examples, the task objects that are identified in task pane 208 may be intelligently surfaced based on a duration of time that they are estimated to take to complete compared with the duration of the focus session that is being scheduled and/or based on the duration of a portion of the focus session that is being scheduled (e.g., a first portion prior to a break, a second portion after a break).

Task pane 208 also includes a list of completed tasks 224, under the heading "completed tasks". The list of completed tasks 224 may include the identities of one or more tasks that have been completed by the user during a focus session (e.g., a focus session on the current day, a focus session during the current week). In other examples, the list of completed tasks 224 may include the identities of one or more tasks that have been completed by the user during a focus session and/or the identities of one or more tasks that have been completed even at times outside of focus sessions. In this example, the list of completed tasks 224 includes the identity of a first task that has been completed ("Task name C"), and a duration of time that the task took to complete, or the estimated duration of time that the task was determined to take to complete. There is also an interactive element in task pane 208 for associating a new task object with the focus session that is being scheduled. The interactive element may be interacted with for creating a new task object or for associating an identity of an existing task object (e.g., from task management service 152) with focus session service 132 and/or focus session setup window 204.

Daily progress pane 210 includes goal display element 226 which indicates a duration of time spent in focus sessions for a current day in relation to a focus session time goal for the current day. That is, a user associated with focus session setup window 204 may set daily durations of time that the user would like to spend in focus sessions and save those durations as goal metrics. The goal durations may be saved to a user account (e.g., in focus session profile data 150). In this example, the user has a goal of being in focus sessions for 1.5 hours each day, and the user has currently completed half of that goal as indicated by half of the circular ring graph of goal display element 226 being filled in, and the text "completed: 45 minutes" below goal display element 226. In other examples, a weekly progress pane corresponding to progress toward focus session goals for a week, or a progress pane corresponding to a different duration of time (e.g., weekend, month), may be displayed in place of daily progress pane 210.

Daily progress pane 210 also includes an indication of a duration of time that the user spent in focus sessions (e.g., how long focus sessions were active on a computing device associated with the user) for the previous day, and an indication of how many days in a row the user has initiated or completed a focus session. The indication of the duration of time that the user spent in focus session for the previous day states "0 minutes" for "yesterday". The indication of how many days in a row the user has initiated or completed a focus session states "0 days" for "streak".

Daily progress pane 210 further includes insight entry point element 225 and edit goal element 227. Although insight entry point element 225 and edit goal element 227 are displayed in daily progress pane 210 it should be understood that they may be displayed in other panes or areas of focus session window 204. Additionally, operations performed based on one or more interactions received by entry point element 225 or edit goal element 227 may similarly be initiated via one or more interactions with a settings menu associated with focus session service 232 and/or focus session window 204. An interaction with insight entry point element 225 may cause a focus session insight, such as focus session insight 1302, 1402, 1502, 1602, 1702, 1802, and/or 1902 to be displayed. An interaction with edit goal element 327 may cause a user interface for modifying a daily, weekly, or monthly focus session goal to be displayed.

Music pane 216 includes the identity of a music service (e.g., audio streaming service 116) and the identities of one or more audio playlists that are each selectable for causing the corresponding playlist to be played during an upcoming focus session. The one or more playlists that are included in music pane 216 may have been intelligently identified by audio streaming service 116 and/or focus session service 132 as being conducive to productivity. For example, playlist selection engine 119 may be utilized to identify the playlists that are surfaced in music pane 216. In some examples, the playlists included in music pane 216 may include a duration of audio/music data that corresponds to, or approximately corresponds to, a duration of time that the upcoming focus session is set for.

In some examples, one or more machine learning models for identifying music that is conducive to being productive may be trained and updated based on receiving telemetry data from users of focus session service 132. For example, focus sessions service 132 may query users after a focus session as to how productive they felt during a focus session. If a positive response is received, the machine learning model that was used to identify the playlist that was played during the focus session may receive positive feedback and update one or more values accordingly. Alternatively, if a negative response is received, the machine learning model that was used to identify the playlist that was played during the focus session may receive negative feedback and update one or more values accordingly. In still additional examples, rather than receiving manual feedback from users to determine whether a focus session was productive, focus session service 132 may determine whether tasks were completed and/or whether users appeared distracted based on analyzing application data from the focus session (e.g., were social networking or non-productivity applications used for more than a threshold duration of time during the focus session). The one or more machine learning models for selecting playlists and/or songs for playlists may thus be updated based on this intelligently identified information.

Local notification filtering pane 212 includes a selectable element for turning on or off the selective filtering of electronic notifications (e.g., via notification filtering manager 134) during the upcoming focus session that are received by the local computing device on which the focus session is going to be initiated on (e.g., client computing device 104). Local notification filtering pane 212 includes the identity of the entity (e.g., "Local device OS") that the electronic notifications will be filtered for if the selectable element is turned on, next to the text "do not disturb" and a selectable element for accessing the settings for the local device next to the text "manage DnD [do not disturb] mode on your device". In examples, a determination of whether to filter an electronic notification from being surfaced may be made based on its content, its sender, and/or an identity of an application from which it originated.

Connected device notification filtering pane 214 includes a selectable element for turning on or off the selective filtering of electronic notifications (e.g., via notification filtering manager 134) during the upcoming focus session that are received by a connected device (e.g., a mobile computing device, such as mobile computing device 106), and/or that may be sent from the connected computing device to the local computing device on which the focus session is going to be initiated on. Connected device notification filtering pane 214 includes the identity of the connected device (e.g., "Phone name") that the electronic notifications will be filtered for if the selectable element is turned on, next to the text "do not disturb" and a selectable element for accessing the settings for the mobile computing device next to the text "manage DnD [do not disturb] mode on your phone". Turning the filtering of electronic notifications on via filtering pane 214 may cause one or more notifications to be blocked from being surfaced on the mobile device (e.g., mobile computing device 106) and/or on a connected local device (e.g., client computing device 104) during the duration of the focus session. In examples, a determination of whether to filter an electronic notification from being surfaced may be made based on its content, its sender, and/or an identity of an application from which it originated.

Figure 3:
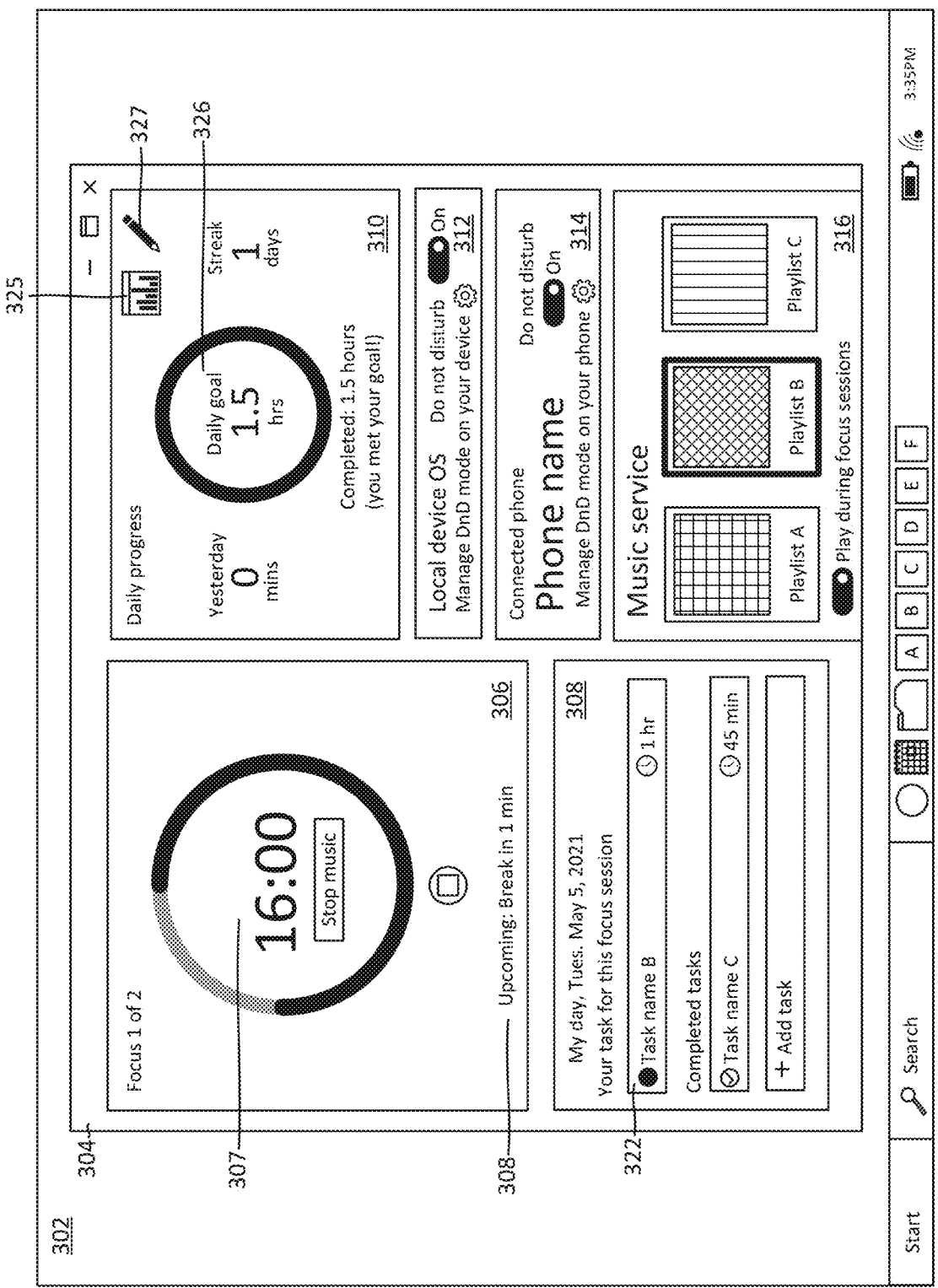
FIG. 3 illustrates an exemplary user interface displaying a focus session window for a currently active focus session.

FIG. 3 illustrates an exemplary user interface 302 displaying a focus session window 304 for a currently active focus session. The user interface 302 may be displayed on a computing device such as client computing device 104 or mobile computing device 106. Focus session window 304 has been surfaced based on selection of focus session initiation element 220 in FIG. 2. The focus session has been set for one hour and the task object corresponding to task name B 322 has been associated with the focus session. Focus session window 304 includes timer pane 306, task pane 308, daily progress pane 310, music pane 316, local notification filtering pane 312, and connected device notification pane 314.

Timer pane 306 includes timer 307 and break notification element 308. Timer 307 provides an indication of how much time is left in the focus session. In this example, timer 307 indicates that there are 16 minutes left in the focus session. Break notification element 308 provides an indication of how much time is left in the focus session before there is a scheduled break in the focus session. The scheduled breaks may be manually scheduled via user input prior to a focus session being initiated, or they may be automatically added to a focus session based on intelligently identified (e.g., via artificial intelligence and/or machine learning models) focus session intervals or break time durations. In this example, break notification element 308 indicates that there will be an upcoming break in one minute.

Task pane 208 includes first text "My day, Tues. May 5, 2021". Below that first text is task name B 322, corresponding to the identity of the task object that has been associated with the first focus session, as indicated by the text "Your task for this focus session". Task name B 322 is also displayed with an indication of a duration of time that task management service 152 or focus session service 132 has estimated task name B 322 will likely take to complete. Task pane 308 also includes a list of completed tasks under the heading "completed tasks". The list of completed tasks may include the identities of one or more tasks that have been completed by the user during a focus session (e.g., a focus session on the current day, a focus session during the current week). In other examples, the list of completed tasks may include the identities of one or more tasks that have been completed by the user during a focus session and/or the identities of one or more tasks that have been completed even at times outside of focus sessions. In this example, the list of completed tasks includes the identity of a first task that has been completed ("Task name C"), and a duration of time that that task took to complete, or the estimated duration of time that the task was determined to take to complete. There is also an interactive element in task pane 308 for associating a new task object with the focus session that is currently active. The interactive element may be interacted with for creating a new task object or for associating an identity of an existing task object (e.g., from task management service 152) with focus session service 132 and/or focus session window 304.

Daily progress pane 310 includes goal display element 326 which indicates a duration of time spent in focus sessions for a current day in relation to a focus session time goal for the current day. That is, a user associated with focus session window 304 may set daily durations of time that the user would like to spend in focus sessions and save those durations as goal metrics. The goal durations may be saved to a user account (e.g., in focus session profile data 150). In this example, the user has a goal of being in focus sessions for 1.5 hours each day, and the user has currently met that goal, as indicated by the entirety of the circular ring graph of goal display element 226 being filled in in black, and the text "completed: 1.5 hours (you met your goal!)" below goal display element 326.

Daily progress pane 310 also includes an indication of a duration of time that the user spent in focus sessions (e.g., how long focus sessions were active on a computing device associated with the user) for the previous day, and an indication of how many days in a row the user has initiated or completed a focus session. The indication of the duration of time that the user spent in focus sessions for the previous day states "0 minutes" for "yesterday". The indication of how many days in a row the user has initiated or completed a focus session states "1 days" for "streak" based on the user meeting the focus session goal for the current day.

Daily progress pane 310 further includes insight entry point element 325 and edit goal element 327. Although insight entry point element 325 and edit goal element 327 are displayed in daily progress pane 310 it should be understood that they may be displayed in other panes or areas of focus session window 304. Additionally, operations performed based on one or more interactions received by entry point element 325 or edit goal element 327 may similarly be initiated via one or more interactions with a settings menu associated with focus session service 132 and/or focus session window 304. An interaction with insight entry point element 325 may cause a focus session insight, such as focus session insight 1302, 1402, 1502, 1602, 1702, 1802, and/or 1902 to be displayed. An interaction with edit goal element 325 may cause a user interface for modifying a daily, weekly, or monthly focus session goal to be displayed.

Music pane 316 includes the identity of a music service (e.g., audio streaming service 116) and the identities of one or more audio playlists that are each selectable for causing the corresponding playlist to be played. The one or more playlists that are included in music pane 316 may have been intelligently identified by audio streaming service 116 and/or focus session service 132 as being conducive to productivity during focus sessions. For example, playlist selection engine 119 may be utilized to identify the playlists that are surfaced in music pane 316. In some examples, the playlists included in music pane 316 may include a duration of audio/music data that corresponds to, or approximately corresponds to, a duration of time that the upcoming focus session is set for. In this example, "Playlist B" is currently being played. That playlist may have been manually selected for streaming/playing by the user, or that playlist may have been automatically selected by the focus session service for playing (e.g., playlist A may have finished so playlist B may be the next playlist in an automated order).

In this example, the user has turned on, or left on, the electronic notification filtering in both local notification filtering pane 212 and connected device notification filtering pane 214. As such, one or more electronic notifications may be filtered from being surfaced by the local computing device displaying focus session window 304 and/or the connected device (e.g., the connected phone). In examples, a determination of whether to filter an electronic notification from being surfaced may be made based on its content, its sender, and/or an identity of an application from which it originated.

Figure 4:
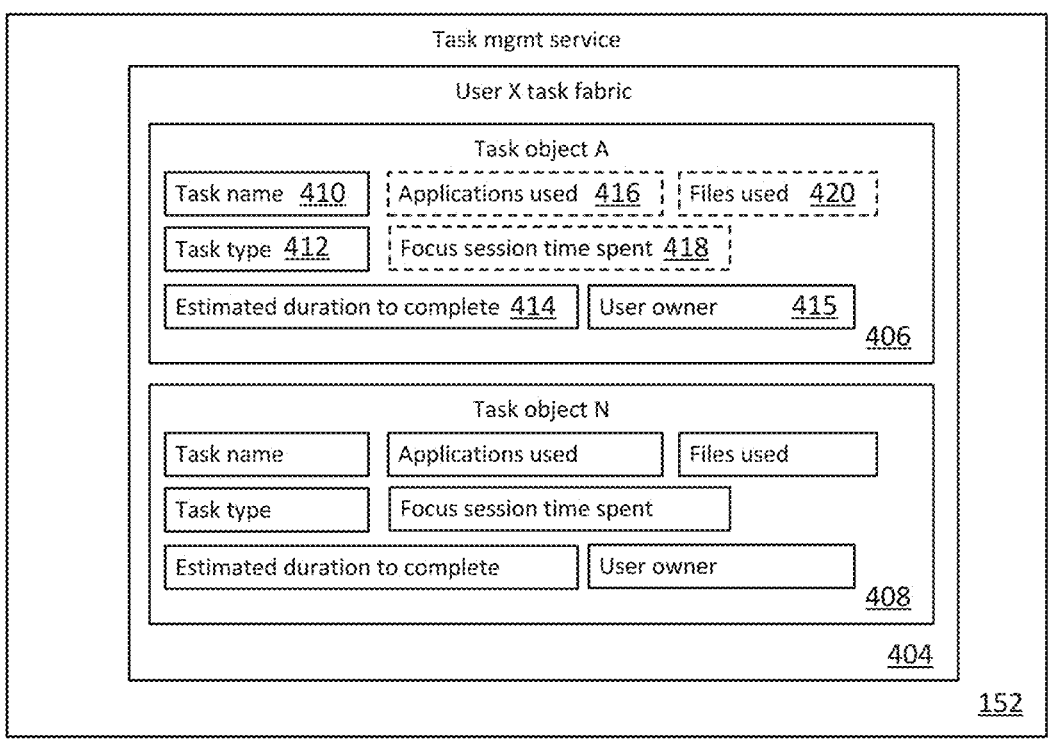
FIG. 4 illustrates an exemplary task fabric and associated task objects maintained by a task management service.

FIG. 4 illustrates an exemplary task fabric 404 ("User X task fabric") and associated task objects (task object A 406, task object N 408) maintained by a task management service. Task fabric 404 may be maintained by task management service 152. Task fabric 404 may be associated with one or more users. That is, task fabric 404 may include task objects that are associated with (e.g., created by, shared with, sent to) one or more users of task management service 152.

Task fabric 404 includes task object A 406 and task object N 408. Task object A 406 comprises a task name 410, a task type 412, an estimated duration of time 414 to complete task object A 406, and an identity of a user owner 415 of task object A 406. Task name 410 may be manually generated and associated (e.g., via user input) with task object A 406, or automatically determined and associated (e.g., via natural language processing of electronic document text associated with a task object) with task object A 406. Task type 412 may be manually generated and associated (e.g., via user input) with task object A 406, or automatically determined and associated with task object A 406. For example, task type 412 may be automatically determined and associated with task object A 406 via processing performed by task type classification engine 156, which may perform operations associated with classifying task objects into task types based on manual user input and/or automated analysis of application data associated with a task. Estimated duration of time to complete 414 task object A 406 may be automatically determined based on analysis of one or more previous focus sessions where a task of the same task type was worked on and/or associated with the one or more previous focus sessions. In some examples, a machine learning model may be trained to estimate durations of time to complete tasks of various task types based on focus session data and application data generated while interacting with applications in focus sessions. In other examples, a user may manually associate an estimated duration of time to complete a task. Such manually entered durations may be associated with other task objects of a same task type.

In this example, task object A 406 includes additional information that has been determined by and sent from focus session service 132 to task management service 152 based on task object A 406 being associated with at least one focus session. Specifically, task object A 406 also includes identities of application(s) used 416 to work on task object A 406 during one or more focus sessions, a duration of focus session time spent 418 working on task object A 406 during one or more focus sessions, and identities of one or more files used 420 to work on task object A 406 during one or more focus sessions.

The duration of focus session time spent 418 working on task object A 406, as well as task type 412 of task object A 406, may be utilized in training and updating one or more machine learning models that are trained to determine estimated durations of time to complete tasks of different task types. Identities of applications used 416 to work on task object A 406, and identities of files used 420 to work on task object A 406 may be utilized for future focus sessions associated with task object A 406 and/or future focus sessions associated with the same task type (e.g., task type 412) to intelligently cause one or more same applications and/or files to be automatically opened or recommended for opening when working on that same task object or task type.

Task object N 408 illustrates that a task fabric such as task fabric 404 may include more than one task object and its corresponding information. Although the task objects associated with a user are indicated as all being stored in task fabric 404 maintained by task management service 152, it should be understood that task objects associated with a user need not necessarily be stored in a single task fabric or a task fabric at all. For example, a first task object associated with a user may be stored in a first task object registry maintained by task management service 152, and a second task object associated with the user may be stored in a second task object registry maintained by task management service 152. However, by maintaining each task object associated with a user in a single task fabric, a single API and/or URI may be utilized (e.g., utilized by focus session service 132, utilized by audio streaming service 116) to obtain task object information from task management service 152.

Figure 5:
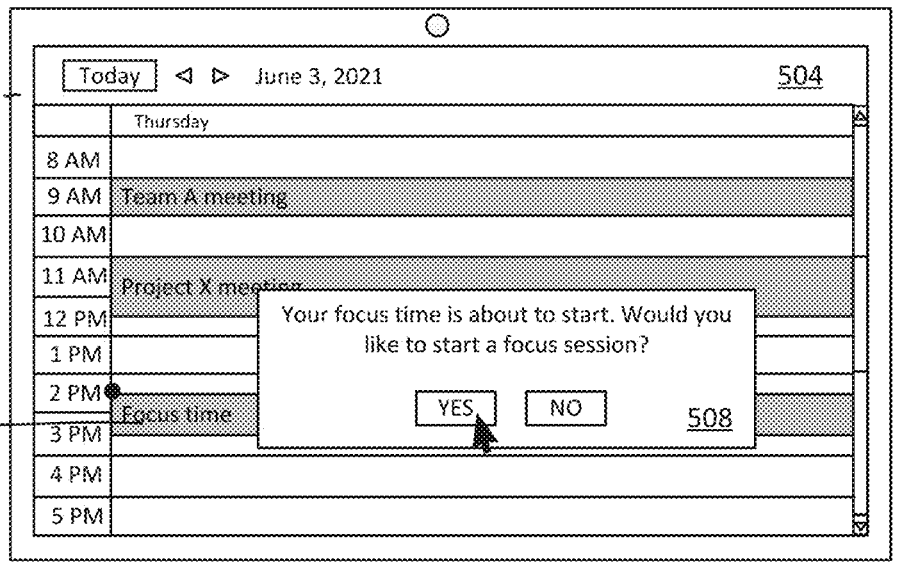
FIG. 5 illustrates the triggering and initiation of a focus session via an electronic calendar application and an electronic calendar object.
Figure 5:
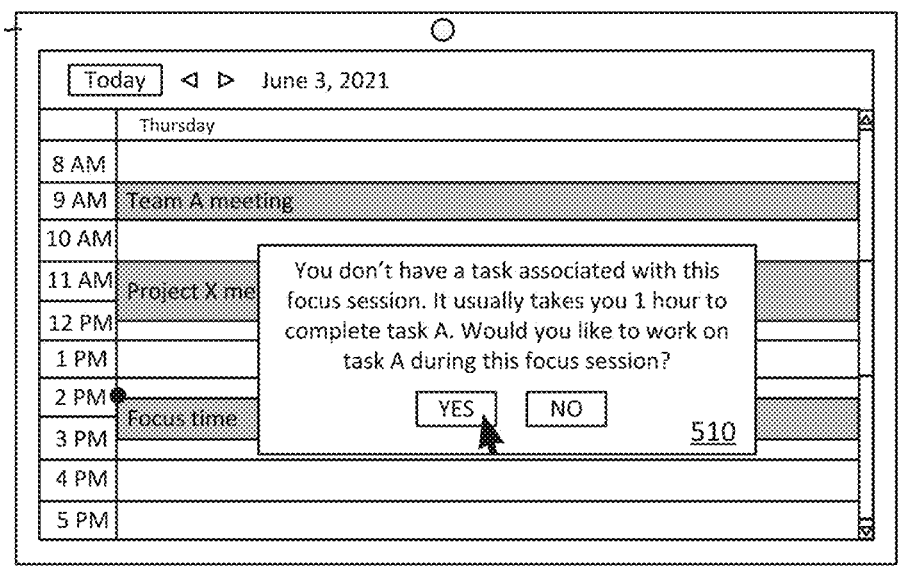
Figure 5:
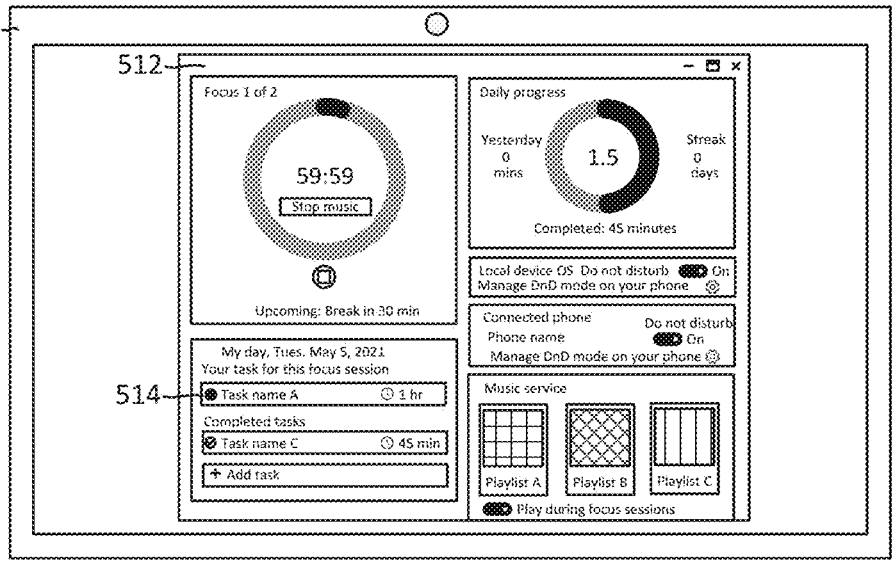

FIG. 5 illustrates the triggering and initiation of a focus session via an electronic calendar application and an electronic calendar object. FIG. 5 includes computing device 502, 502* and 502**, which are all the same computing device on which a series of displays related to initiation of a focus session are illustrated. Computing device 502 may execute a focus session application and or access a focus sessions service that may cause a focus session to be initiated and a focus session window to be displayed on computing device 502.

Computing device 502 currently displays electronic calendar application 504. Electronic calendar application 504 displays electronic calendar objects, corresponding to booked events, for the user account associated with computing device 502. Specifically, electronic calendar application 504 displays electronic calendar objects for Jun. 3, 2021. A first electronic calendar object is named "Team A meeting" and is scheduled from 9 AM to 10 AM, a second electronic calendar object is named "Project X meeting" and is scheduled from 11 AM to 12:30 PM, and a third electronic calendar object is named "Focus time" and is scheduled from 2:30 PM to 3:30 PM.

The focus time calendar object may have been manually scheduled by a user, or automatically scheduled by focus session service 132 based on focus session goals for the user account associated with the electronic calendar application and computing device 502. The focus time calendar object may have been manually or automatically associated as a focus session with the focus session service or application. In this example, the current time is either at the start time of the focus time calendar object or within a threshold duration of the start time of the focus time calendar object. As such, the electronic calendar application or the focus session application or service may cause first input element 508 to be surfaced. First input 508 states "Your focus time is about to start. Would you like to start a focus session?" and has selectable "Yes" and "No" elements. In this example, the user selects the "Yes" element.

Moving to the next display in the series, on computing device 502*, upon the selection of the "Yes" element from first input element 508, the electronic calendar application or the focus session application or service may cause second input element 510 to be surfaced. Second input element 510 states "You don't have a task associated with this focus session. It usually takes you 1 hour to complete task A. Would you like to work on task A during this focus session?" and selectable "Yes" and "No" elements. Thus, in some examples, focus session service 132 may cause a task of a task type that has an estimated duration of time to complete that corresponds to, or approximately corresponds to, the duration of time for an upcoming focus session to be surfaced as a suggestion.

In this example, the user selects the "Yes" element of second input element 510, and a focus session is automatically initiated and associated with task A (e.g., "Task name A" 514), as indicated by the next display in the series and focus session window 512 of computing device 502**.

Although in this example there are multiple input elements (e.g., first input element 508, second input element 510) that are interacted with prior to the focus session being initiated, it should be understood that a focus session may be automatically initiated based on determining that the current time is the start time of an electronic calendar object with a focus session designation, or that the current time is within a threshold duration of time of the start time of an electronic calendar object with a focus session designation. A task object may be associated with a focus session after the focus session is initiated. Additionally, other mechanisms may be utilized for initiating a focus session associated with an electronic calendar object. For example, a user may interact with (e.g., via a double mouse click, via a touch input, via a left mouse click, via a voice command) an electronic calendar object that has a focus session designation (or even an electronic calendar object that does not have a focus session designation) which may cause a selectable element to initiate a focus session to be displayed. The user may then select that element and thereby cause a focus session corresponding to the electronic calendar object to be initiated.

Figure 6:
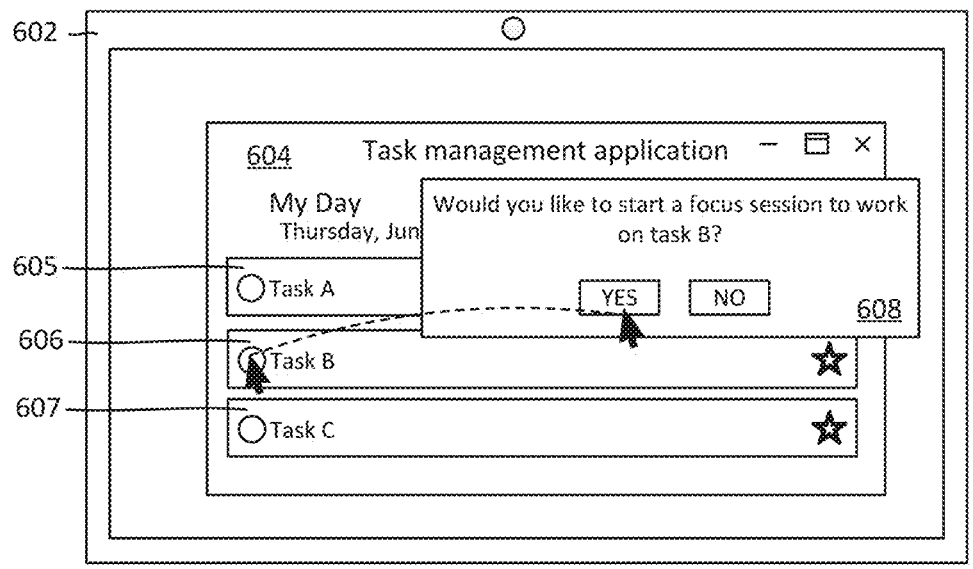
FIG. 6 illustrates the triggering and initiation of a focus session via interaction with a task object in a task management application.
Figure 6:
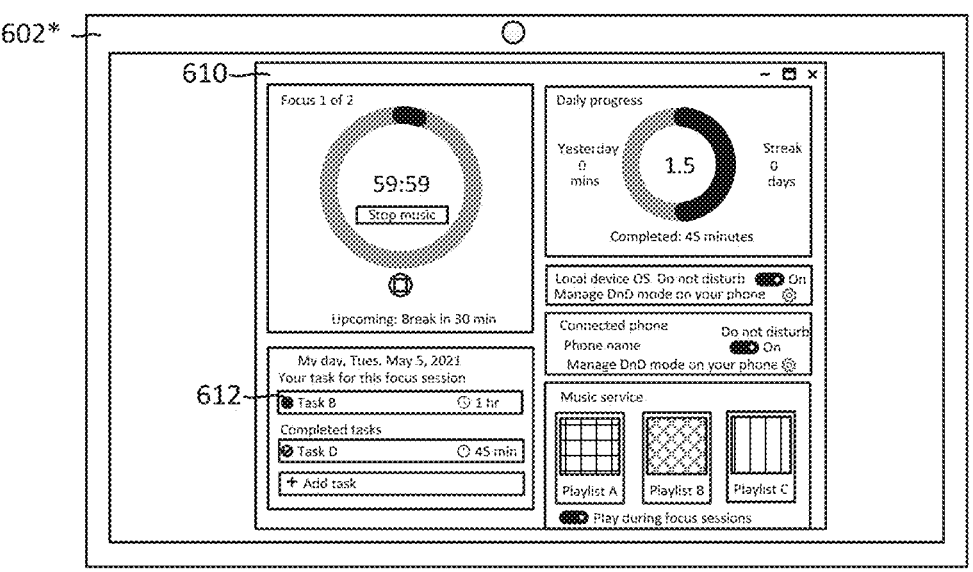

FIG. 6 illustrates the triggering and initiation of a focus session via interaction with a task object 606 in a task management application 604. FIG. 6 includes computing device 602 and 602*, which are both the same computing device. Computing device 602 may execute a focus session application or access a focus session service that may cause a focus session to be initiated and a focus session window displayed on computing device 602.

Computing device 602 currently displays task management application 604. Task management application 604 displays task objects corresponding to tasks that have not yet been completed and/or tasks that have been associated with completing on a specific day (e.g., Thursday, Jun. 3, 2021 under the heading "My Day"). Specifically, task management application 604 displays first task object 605 ("Task A"), second task object 606 ("Task B"), and third task object 607 ("Task C"). A selection is made of second task object 606, which causes input element 608 to be surfaced. Input element 608 states "Would you like to start a focus session to work on task B?" with selectable "Yes" and "No" elements. In this example, a selection is made of the "Yes" element, and a focus session is automatically initiated and associated with second task object 606, as indicated by focus session window 610 and second task object identity 612 displayed on computing device 602*. In some examples, a focus session may be automatically initiated based on an estimated duration of time associated with a task object (e.g., determined based on task type).

It should be understood that other mechanisms for initiating a focus session from a task management application and/or associating a task object with a focus session from a task management application are within the scope of this disclosure. As an example, a user may drag and drop a task object element from the task management application into a focus session application window to initiate a focus session and associate the focus session with the corresponding task object. In another example, a task management application may receive a spoken input to initiate a focus session and associate a task object with the focus session. The task management application may process that command with a natural language processing engine, identity a command and/or an initiate focus session intent as well as identify the task object, utilize one or more APIs to interact with the focus session application or service and cause a focus session to be initiated and associated with the corresponding task object.

Figure 7:
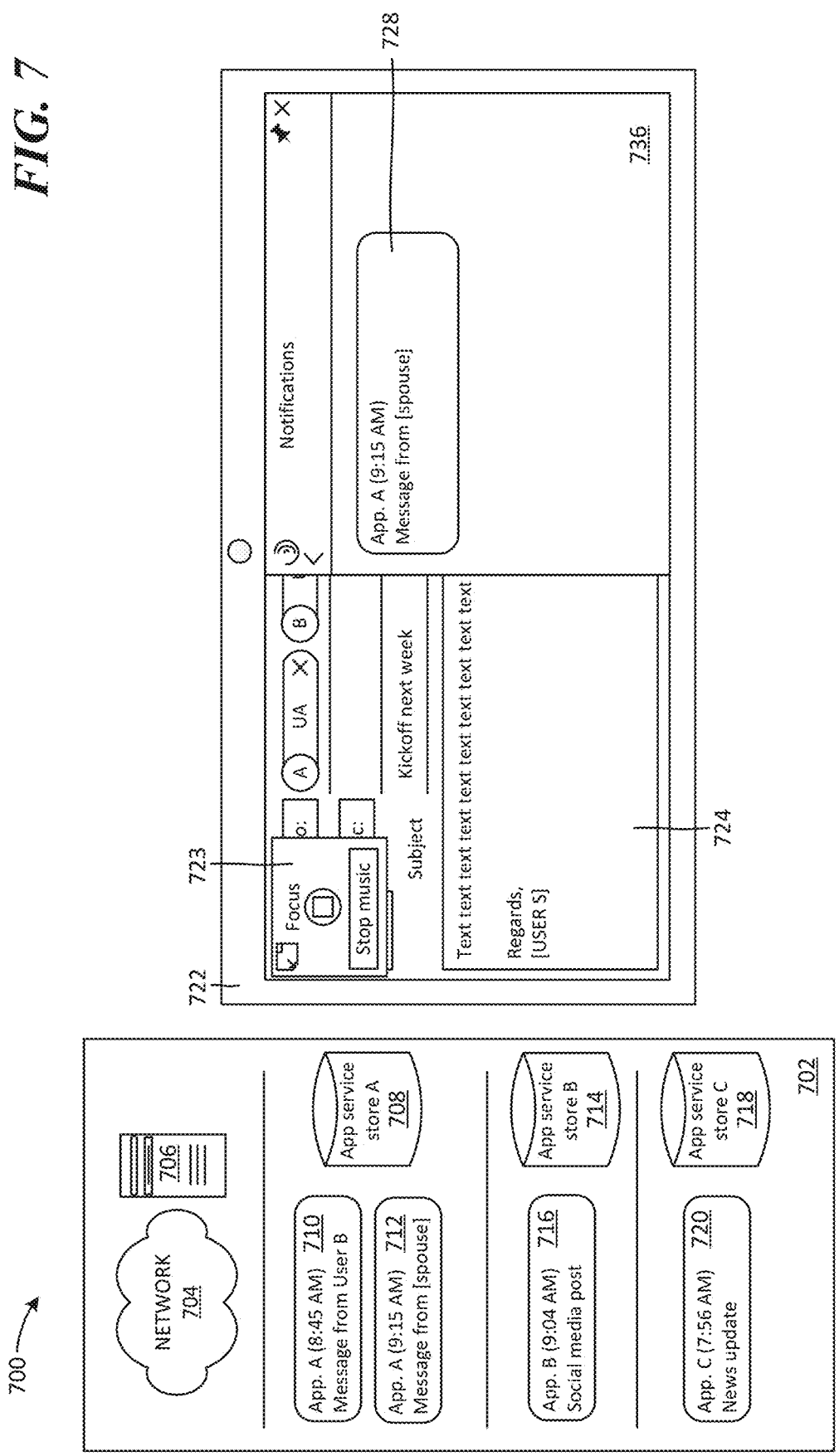
FIG. 7 illustrates a computing environment for filtering electronic notifications during a focus session.

FIG. 7 illustrates a computing environment 700 for filtering electronic notifications during a focus session. Computing environment 700 includes application service store sub-environment 702 and computing device 722.

In this example, a user has initiated a focus session and the focus session is currently in progress. The focus session window has been minimized; however, a focus session icon 723 remains at the foreground. That is, even when a focus session window has been minimized (e.g., so that a user can utilize display space for working on tasks), a focus session icon 723 may continue to be displayed. The focus session icon 723 may indicate that a focus session is in progress, a duration of time left in the focus session, an identity of a song that is currently being played, an identity of a playlist that is currently being played, and/or contain a selectable element for stopping music that is currently being played. The settings for the current focus session have turned electronic notification filtering on (e.g., via notification filtering manager 134). In this example, focus session icon 723 is displayed in the foreground above email application 724, which a user is currently working in during the focus session.

Application service store sub-environment 702 includes network 704 and server computing device 706. Computing device 722 may communicate with any of the application services described herein via network 704. Server computing device 706 is illustrative of a server computing device which may host one or more of the application services described herein and/or focus session service 132. Application service store sub-environment 702 further includes application service store A 708, which may host data associated with application A (e.g., an electronic messaging application service); application service store B 714, which may host data associated with application B (e.g., a social media application service); and application service store C 718, which may host data associated with application C (e.g., a news application service).

Computing device 722 and/or a user account associated with computing device 722 may have subscribed and/or allowed each of the application services illustrated in application service store sub-environment 702 to surface electronic notifications on computing device 722. The user account associated with computing device 722 may have provided focus session service 132 (or a corresponding focus session application executed by computing device 722) with access to the user's data (e.g., application data, contact list) and focus session service 132 (or a corresponding focus session application executed by computing device 722) may utilize that information to filter electronic notifications in relation to computing device 722 and/or the application services included in application service sub-environment 702.

In this example, there are two electronic notifications generated by the application service associated with application service store A 708. Specifically, first electronic notification 710 was generated at 8:45 AM and is a message from User B; and electronic notification 712 was generated at 9:15 AM and is a message from [spouse]. There is one electronic notification generated by the application service associated with application service store B 714. Specifically, third electronic notification 716 was generated at 9:04 AM, which indicates that there is a new social media post that the user might be interested in. There is also one electronic notification generated by the application service associated with application service store C 718. Specifically, fourth electronic notification 720 was generated at 7:56 AM, which indicates that there is a news update that the user might be interested in.

Notification filtering manager 134 may receive an indication from each of the application services when a new notification is generated for the user account associated with computing device 722. Based on the focus session currently being in progress, notification filtering manager 134 may determine an application priority score for the application (e.g., application service) that generated the electronic notification, determine a notification priority score for the electronic notification, determine a combined priority score from the application priority score and the notification priority score, and cause the electronic notification to be surfaced by computing device 722 if the combined priority score meets a threshold surfacing value, or block the electronic notification from being surfaced by computing device 722 if the combined priority score does not meet the threshold surfacing value.

In this example, the combined priority score for only one of the electronic notifications meets the threshold surfacing value. Specifically, break-through electronic notification 728, corresponding to electronic notification 712 from the user's spouse meets the threshold surfacing value. This may be based on the sender of the electronic notification (e.g., the user's spouse) having a relatively higher contact importance value in relation to any of the other electronic notification senders. In additional examples, the application priority score for the application service associated with application service store A 708 may be relatively higher than for the application priority scores for the other two applications. Regardless, because the combined priority score for the electronic notification 712 is above the threshold surfacing value, that notification is caused to be surfaced as break-through notification 728 in notification pane 736 over the email application 724 that is currently being executed by computing device 722.

Figure 8:
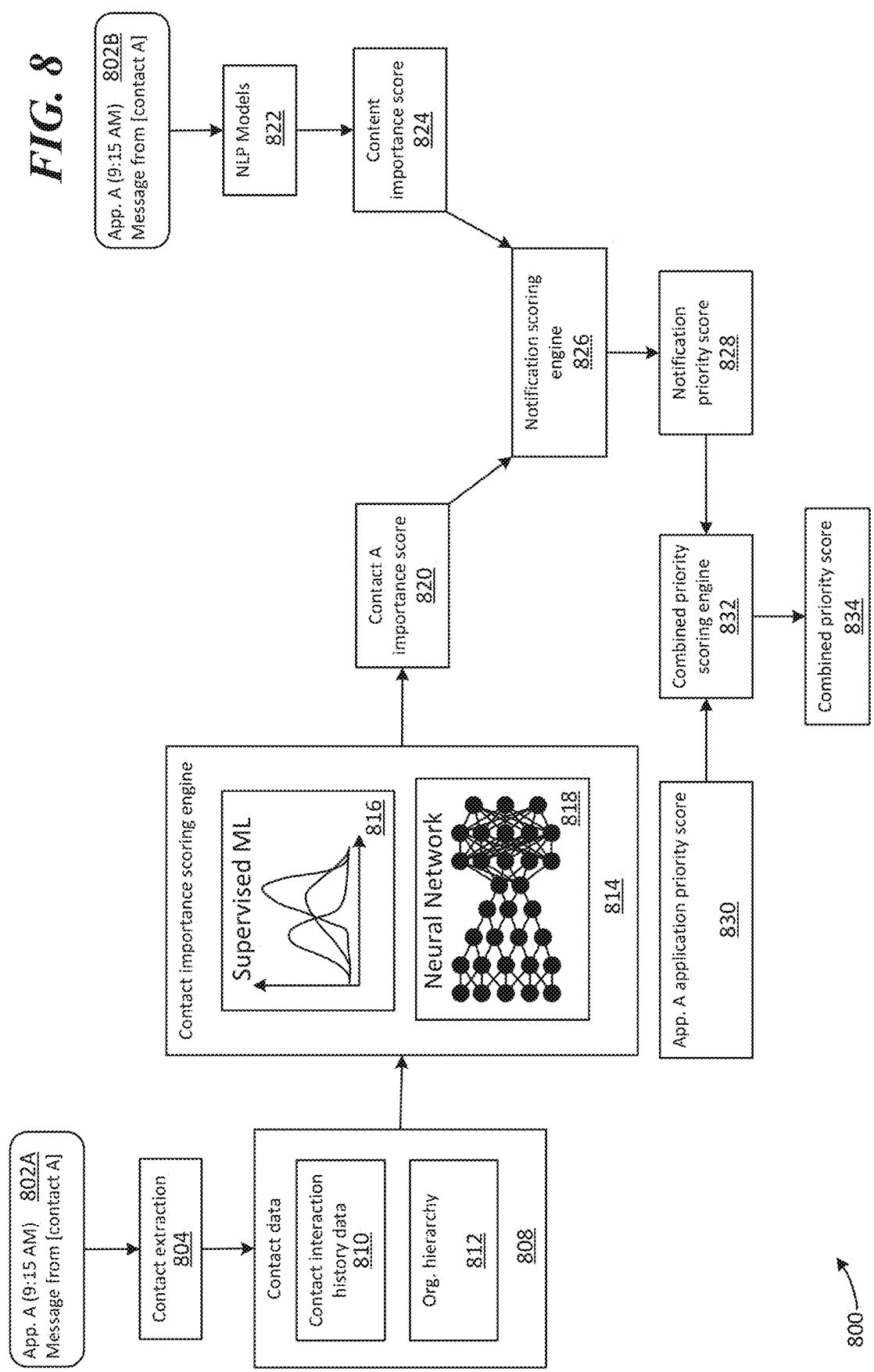
FIG. 8 illustrates a simplified block diagram for determining a contact importance score, a content importance score, a notification priority score, and a combined priority score.

FIG. 8 illustrates a simplified block diagram 800 for determining a contact importance score, a content importance score, a notification priority score, and a combined priority score. One or more operations described in relation to block diagram 800 may be performed by notification filtering manager 134. Block diagram 800 includes electronic notification 802A and electronic notification 802B, which are the same electronic notification. Electronic notification 802A/802B is an electronic notification generated by application A at 9:15 AM, which is a message from [contact A].

Contact information from electronic notification 802A may be extracted and analyzed as illustrated by contact extraction element 804. For example, contact data element 808 illustrates that the identity of the sender (e.g., [contact A]) of the electronic message corresponding to electronic notification 802A, which is extracted at contact extraction element 804, may be analyzed to identity contact interaction history data 810 and a position of [contact A] in organizational hierarchy 812. Contact interaction history data 810 may comprise communication history between [contact A] and the user account for which a determination is being made as to whether to surface electronic notification 802A (e.g., the receiver of the message).

Contact data 808 may be processed by one or more machine learning models, as illustrated by contact importance scoring engine 814, which includes supervised machine learning model 816, and neural network 818. A contact importance score may be determined based on that processing, as illustrated by contact A importance score 820.

Moving to the right side of block diagram 800, textual content from electronic notification 802B and/or textual content associated with electronic notification 802B (e.g., the text from the corresponding message, the text associated with a social media post for a social media notification) may be extracted and processed. In some examples, the text may be preprocessed (e.g., identification of strings, converting strings to lowercase letters, application of word tokenizer), and further processed by one or more natural language processing models, as illustrated by natural language processing models element 822. Natural language processing models 822 may comprise keyword or phrase matching models that match keywords or phrases from electronic notification 802B (or from the message itself) to important keywords or phrases, spam keywords or phrases, or unimportant keywords or phrases. In other examples, natural language processing models 822 may comprise an embedding model in which determinations are made as to similarity scores in relation to important, unimportant, and/or spam embeddings. An exemplary embedding model is more fully discussed below in relation to FIG. 9.

The result of the processing performed at natural language processing models element 822 is a content importance score, as illustrated by content importance score element 824. A notification priority score is then determined from contact A importance score 820 and content importance score 824, as illustrated by notification scoring engine 826 and resulting notification priority score element 828. One or more weighted or non-weighted functions or machine learning models may then be applied to an application priority score corresponding to the application that generated electronic notification 802A/802B illustrated by application A priority score 830. The application of the one or more weighted or non-weighted functions or machine learning models to the application priority score and the notification priority score is illustrated by combined priority scoring engine 832. The combined priority score is thus determined by combined priority scoring engine 832, as illustrated by combined priority score element 834.

Figure 9:
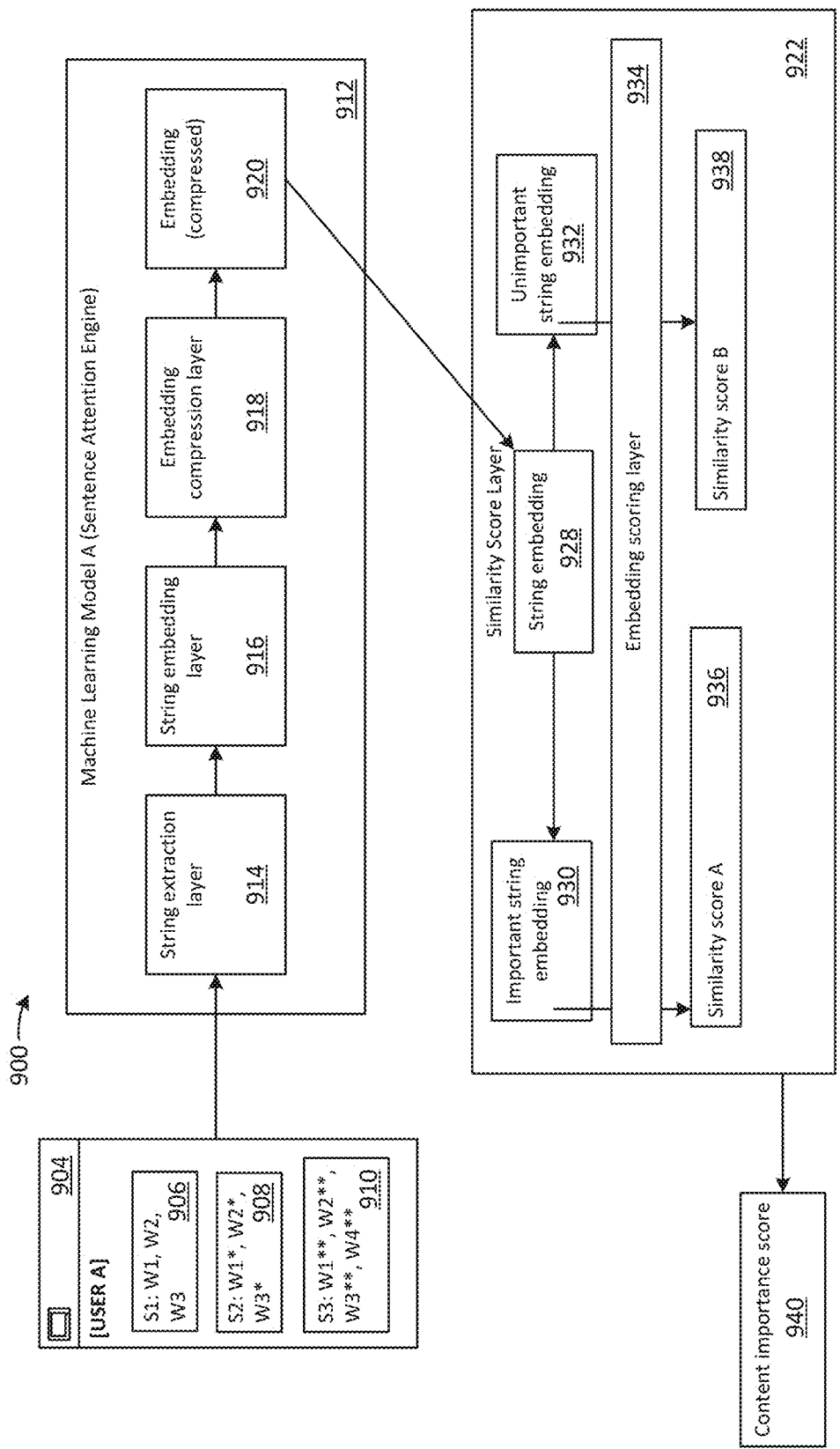
FIG. 9 illustrates a simplified block diagram of a natural language processing model for determining a content importance score for an electronic notification for use in filtering electronic notifications during a focus session.

FIG. 9 illustrates a simplified block diagram of a natural language processing model for determining a content importance score for an electronic notification for use in filtering electronic notifications during a focus session. Block diagram 900 includes electronic notification 902, which is a message notification from [user A] to a user account associated with focus session service 132. Electronic notification 904 and/or the message associated with electronic notification 904 includes the identity of the sending user ([user A]) and textual content that includes three text strings, first string 906, second string 908, and third string 910.

The textual content of electronic notification 904 (or from the message itself) is processed by machine learning model A 912, which may comprise a sentence attention model. Each of the three text strings are extracted by string extraction layer 914. From string extraction layer 914, the strings are passed to string embedding layer 916. String embedding layer 916 comprises a language embedding model. The language embedding model creates an embedding for each string. The language embedding model may comprise a contextual embedding model (e.g., a BERT model, an ELMo model, a recurrent neural network model, a LSTM model, a GRU model). In some examples, string embedding layer 916 may combine the embeddings from one or more strings into an overall embedding for an electronic notification or its corresponding textual content (e.g., message content, social media post content, news article content).

The embeddings generated at string embedding layer 916 may be passed to embedding compression layer 918. Embedding compression layer 918 may comprise a model for transforming a continuous embedding generated for a string by string embedding layer 916 into a binary form. As examples, embedding compression layer 918 may comprise one or more of: a direct binarization with a hard threshold model, reducing the dimensionality with either a random projection or principal component analysis model, and/or an encoding-decoding framework with an additional semantic-preserving loss model.

The compressed (binary) embedding for each string (or the embedding for the message as a whole) is represented by compressed embedding element 920. The embedding for a string (or the embedding for the message as a whole) is represented in a compressed or uncompressed form as string embedding 928 in similarity score layer 922. The embedding is incorporated in an embedding library comprised of a plurality of language embeddings for other textual content (e.g., important string embedding 930, unimportant string embedding 932). The embedding library includes previously embedded text, and those embeddings may be associated with an importance classification, an unimportance classification, and/or a spam classification. In some examples, a plurality of the embeddings in similarity score layer 922 may have been manually classified as important, unimportant, and/or as spam, and one or more new embeddings may have been automatically classified as important, unimportant, or as spam based on their similarity scores in relation to the manually classified embeddings.

Similarity scores may be calculated via application of a similarity score model to the new embeddings from the newly embedded strings, and one or more of the embeddings from the embedding library (e.g., important string embedding 930, unimportant string embedding 932). In some examples, the similarity score model may be a cosine model. In other examples, the similarity score model may be a Hamming model. In this example, this is illustrated by similarity score layer 934.

A similarity score may be calculated between each embedded string (or the embedding for the message as a whole) and an embedding for important string embedding 930. The scoring and calculation are illustrated by embedding scoring layer 934. Thus, a similarity score, such as similarity score A 936, may be calculated for one or more of the strings associated with electronic notification 904 and important string embedding 930.

A similarity score may also be calculated between each embedded string (or the embedding for the message as a whole) and an embedding for unimportant string embedding 932. The scoring and calculation are illustrated by embedding scoring layer 934. Thus, a similarity score, such as similarity score B 938, may be calculated for one or more strings associated with electronic notification 904 and unimportant string embedding 932.

A determination may be made based on the similarity scores for the embedded strings of electronic notification 904 as to how important the content of electronic notification 904 (or message corresponding to electronic notification 904) is likely to be to the user. This importance is illustrated by content importance score 940, which may be a score calculated from one or more similarity scores, such as similarity score A 936 and/or similarity score B 938.

Figure 10:
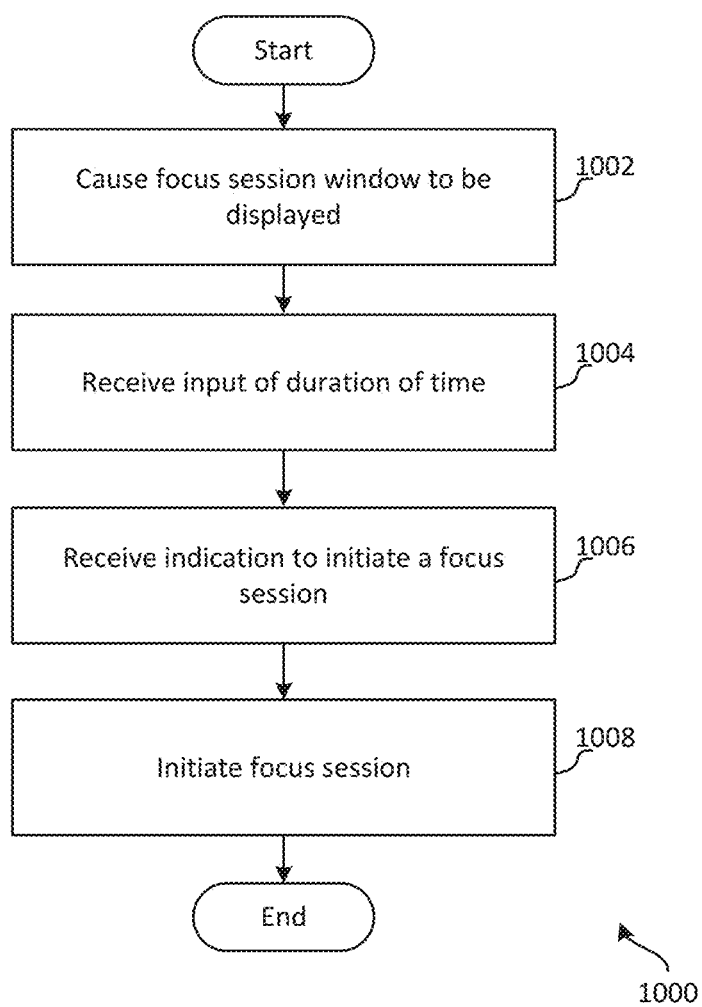
FIG. 10 is an exemplary method for assisting with managing a focus session.

FIG. 10 is an exemplary method 1000 for assisting with managing a focus session. The method 1000 begins at a start operation and flow moves to operation 1002.

At operation 1002 a focus session window is caused to be displayed. The focus session window may comprise: a timer pane comprising a focus session duration input element, a task pane comprising an identity of at least one task object created by a task management application, and a music pane comprising an identity of at least one music playlist. In some examples, the focus session window may further comprise a daily progress pane that includes a goal display element indicating a duration of time spent in focus sessions for a current day in relation to a focus session time goal for the current day.

From operation 1002 flow continues to operation 1004 where an input of a duration of time is received at the focus session duration input element. The focus session window and/or a focus session setup window may be utilized to initiate a focus session. An input may be received at the focus session duration input element to add a duration of time that the focus session will be active for. In some examples, depending on the duration of time that the focus session will be active for, one or more breaks may be included in the focus session. In some examples, the times in the focus session where the one or more breaks are scheduled and/or the duration of the one or more breaks may be intelligently identified via a machine learning model. For example, a machine learning model may process focus session application data for the user setting up the focus session, or one or more other users, and determined that the user setting up the focus session, or other users, need breaks every X minutes to be most productive, or breaks to be of Y minutes in duration to be most productive.

From operation 1004 flow continues to operation 1006 where an indication to initiate the focus session is received. The indication may comprise an input on an input element of the focus session window or spoken input that may be processed by one or more n natural language processing engines.

From operation 1006 flow continues to operation 1008 where the focus session is initiated based on the received indication. The initiating may comprise causing a timer for the duration of time to be initiated and displayed in the timer pane and causing one of the music playlists to be automatically played. In some examples, the timer may be initiated via a user input. For example, the focus session window may include a start button that may be interacted with for initiating the timer. In other examples, a voice command to initiate the timer may be processed by the focus session application or service and the timer may be initiated based on that processing. In still other examples, the timer may be initiated by one or more trigger events (e.g., a duration of time being added to the duration input element, a specific time occurring).

In some examples, a user may select which of the one or more playlists will be automatically played when the focus session is initiated prior to the playlist being played. In additional examples, a user may switch playlists during the duration of the focus session. The audio files that are included in the one or more playlists may be selected via one or more rules, algorithms, and/or machine learning models. In some examples, the rules, algorithms, and/or machine learning models may be updated and/or trained based on user feedback indicating one or more focus session playlists, or audio files included in a focus session playlist, were appropriate or inappropriate for listening to during a focus session. In additional examples, the rules, algorithms, and/or machine learning models may be updated and/or trained based on the receiving of automatically collected application data that indicates that one or more focus session playlists, or audio files included in a focus session playlist, were helpful in producing a productive focus session.

From operation 1008 flow moves to an end operation and the method 1000 ends.

Figure 11:
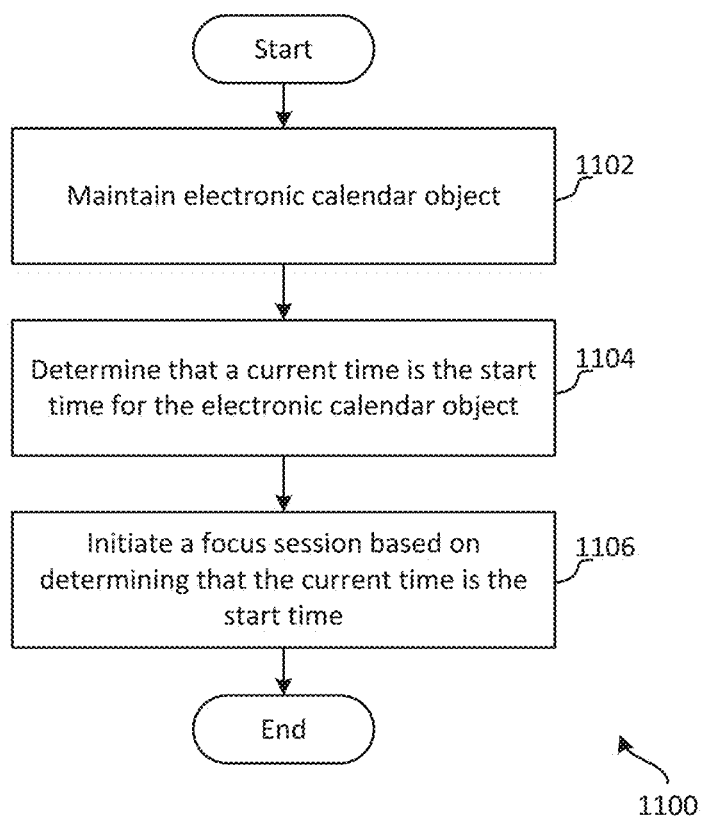
FIG. 11 is an exemplary method for initiating a focus session from an electronic calendar object.

FIG. 11 is an exemplary method 1100 for initiating a focus session from an electronic calendar object. The method 1100 begins at a start operation and flow moves to operation 1102.

At operation 1102 an electronic calendar object is maintained. The electronic calendar object may comprise a date, a start time and duration of time on the date, and a focus session designation. The electronic calendar object may have been manually scheduled by a user associated with the electronic calendar object, or automatically scheduled based on focus session goals for the user (e.g., user account) associated with the electronic calendar object.

From operation 1102 flow continues to operation 1104 where a determination is made that a current time is the start time for the electronic calendar object. In other examples, the determination made at operation 1104 may be that the current time is at least a threshold duration of time from the start time of the electronic calendar object.

From operation 1104 flow continues to operation 1106 where a focus session is initiated based on determining that the current time is the start time. Initiating the focus session may comprise causing a focus session window to be displayed. The displayed focus session window may comprise: a timer pane, a task pane comprising an identity of at least one task object created by a task management application, and a music pane comprising an identity of at least one music playlist. In some examples, the displayed focus session window may further comprise a daily progress pane that includes a goal display element indicating a duration of time spent in a focus session for a current day in relation to a focus session time goal for the current day. Initiating the focus session may further comprise causing a timer for the duration of time to be initiated and displayed in the timer pane and causing one of the music playlists to be automatically played.

From operation 1106 flow moves to an end operation and the method 1100 ends.

Figure 12:
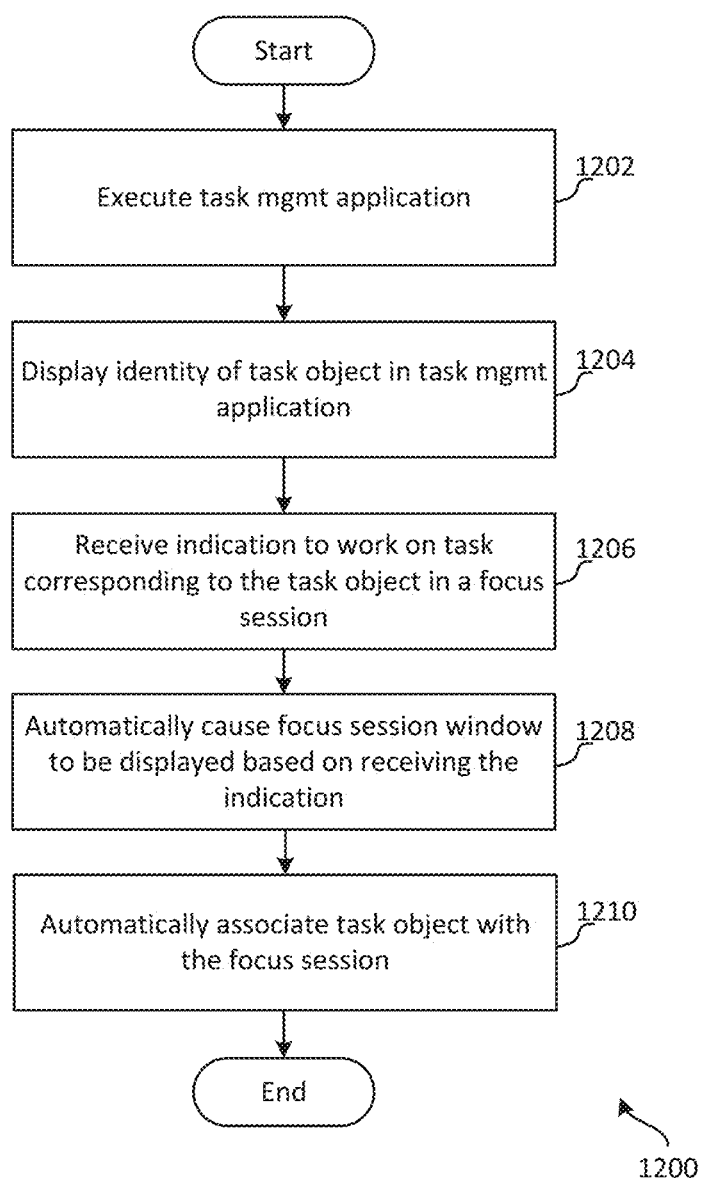
FIG. 12 is an exemplary method for initiating a focus session from a task management application.

FIG. 12 is an exemplary method 1200 for initiating a focus session from a task management application. The method 1200 begins at a start operation and flow moves to operation 1202.

At operation 1202 a task management software application is executed. The task management software application may be executed all or in part locally (e.g., via a local computing device) or all or in part remotely (e.g., in the cloud). The task management software application may assist with task management and execution. For example, the task management software application may include the identities of tasks that one or more users have added to an electronic to-do list, applications associated with the completion of tasks, electronic calendar entries and/or due dates associated with tasks, and task type classifications of tasks. In some examples, the task management software application may be associated with a task management service.

From operation 1202 flow continues to operation 1204 where an identity of a task object is displayed in the task management software application. The identity may comprise a name of a task corresponding to the task object. In some examples, the identity of the task object may include a task type associated with the task object. The task type may be manually determined and associated with the task object or automatically determined and associated with the task object. Non-limiting examples of task types that the task object may be associated with include work type, personal type, compose email type, draft electronic document type, draft electronic document for a project of a specific classification type, review data type, and review electronic document type. In examples, where the task type is automatically determined, the determining may comprise analysis of application data by the task management application or service. Automated analysis of application data for classifying task objects into task types may comprise applying one or more natural language processing models to textual content associated with one or more task objects. The one or more natural language processing models may have been trained to classify text into one or more task type categories. In some examples, the one or more natural language processing models may comprise keyword or phrase matching models. In other examples, the one or more natural language processing models may comprise vector embedding models (e.g., BERT, ELMo).

From operation 1204 flow continues to operation 1206 where an indication to work on a task corresponding to the task object in a focus session is received in the task management software application. The indication may comprise an input (e.g., touch input, mouse click, voice command) on the identity of the task object, or an element on or adjacent to the identity of the task object. In other examples, the indication may comprise a voice command that is processed by the task management application or service.

From operation 1206 flow continues to operation 1208 where a focus session window is automatically caused to be displayed based on receiving the indication to work on the task corresponding to the task object in a focus session. The displayed focus session window may comprise a timer pane and a music pane comprising an identity of at least one music playlist. In some examples, the focus session window may further comprise a task pane comprising an identity of the task object and/or a daily progress pane that includes a goal display element indicating a duration of time spent in focus sessions for a current day in relation to a focus session time goal for the current day. Initiating the focus session may comprise causing a timer for a specified duration of time to be initiated and displayed in the timer pane and causing one of the music playlists to be automatically played.

From operation 1208 flow continues to operation 1210 where the task object is automatically associated with the focus session (e.g., in focus session profile data store 150, in task object data store 154).

From operation 1210 flow moves to an end operation and the method 1200 ends.

Figure 13:
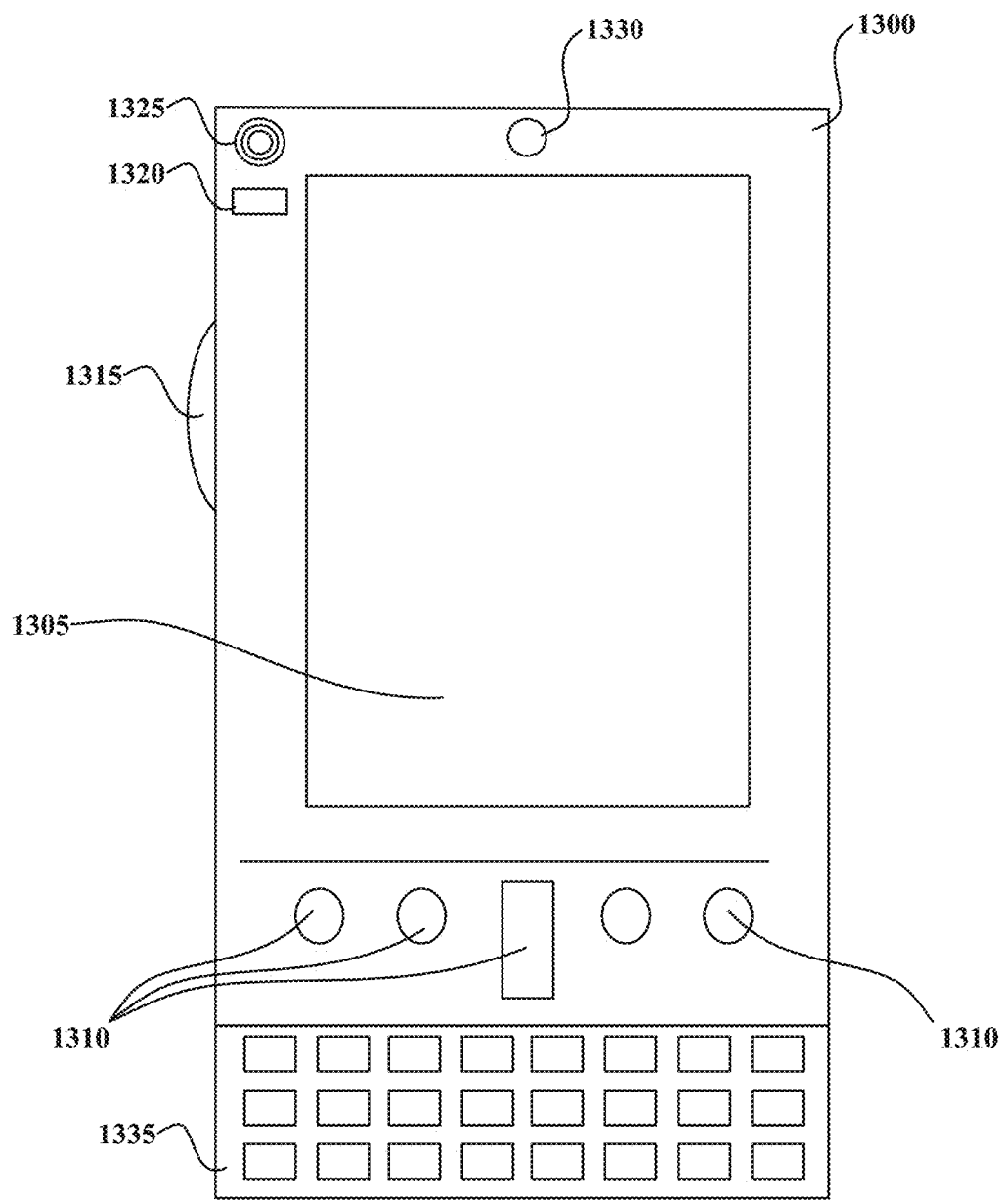
FIGS. 13 and 14 are simplified diagrams of a mobile computing device with which aspects of the disclosure may be practiced.
Figure 14:
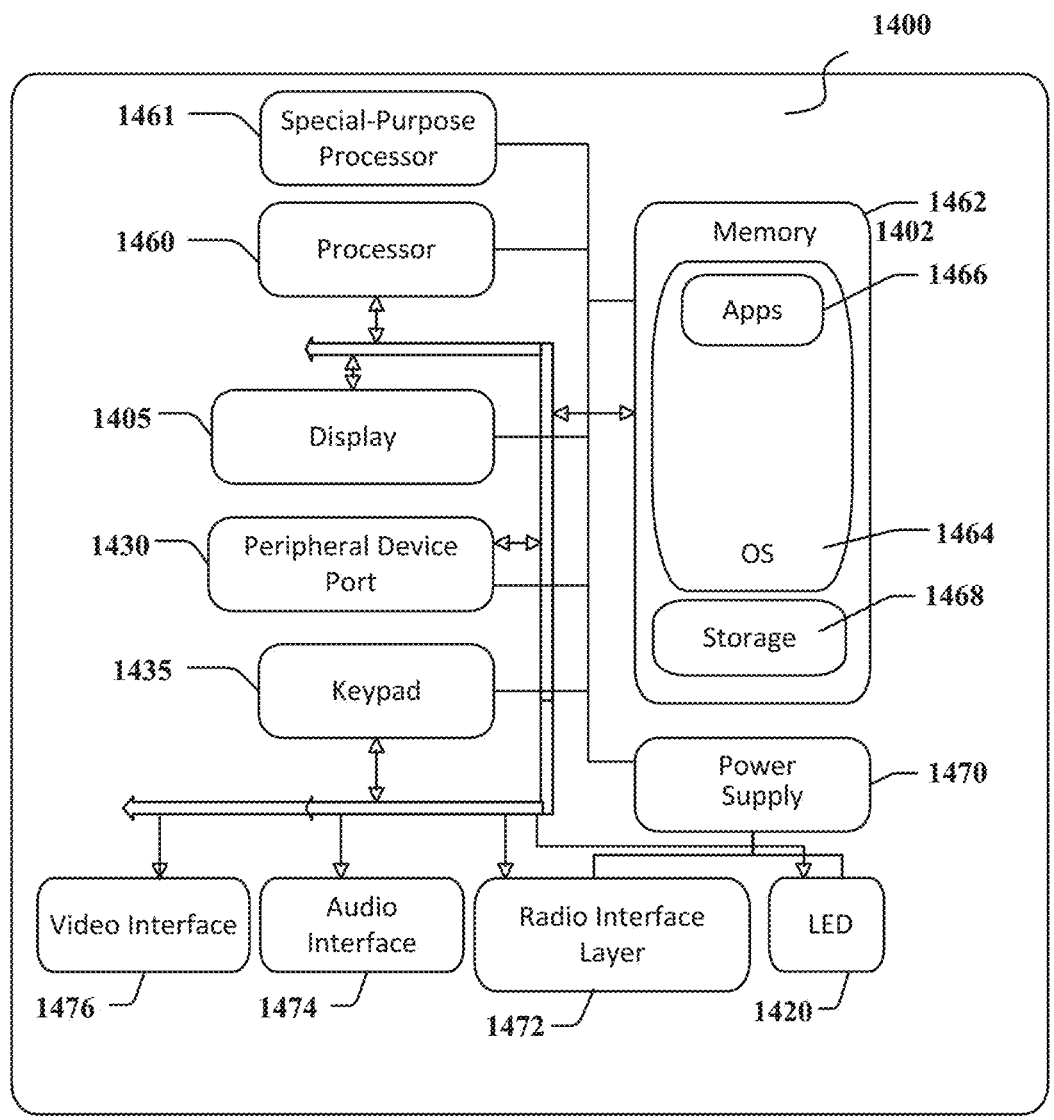

FIGS. 13 and 14 illustrate a mobile computing device 1300, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 13, one aspect of a mobile computing device 1300 for implementing the aspects is illustrated. In a basic configuration, the mobile computing device 1300 is a handheld computer having both input elements and output elements. The mobile computing device 1300 typically includes a display 1305 and one or more input buttons 1310 that allow the user to enter information into the mobile computing device 1300. The display 1305 of the mobile computing device 1300 may also function as an input device (e.g., a touch screen display). If included, an optional side input element 1315 allows further user input. The side input element 1315 may be a rotary switch, a button, or any other type of manual input element. In alternative aspects, mobile computing device 1300 may incorporate more or fewer input elements. For example, the display 1305 may not be a touch screen in some embodiments. In yet another alternative embodiment, the mobile computing device 1300 is a portable phone system, such as a cellular phone. The mobile computing device 1300 may also include an optional keypad 1335. Optional keypad 1335 may be a physical keypad or a "soft" keypad generated on the touch screen display. In various embodiments, the output elements include the display 1305 for showing a graphical user interface (GUI), a visual indicator 1320 (e.g., a light emitting diode), and/or an audio transducer 1325 (e.g., a speaker). In some aspects, the mobile computing device 1300 incorporates a vibration transducer for providing the user with tactile feedback. In yet another aspect, the mobile computing device 1300 incorporates input and/or output ports, such as an audio input (e.g., a microphone jack), an audio output (e.g., a headphone jack), and a video output (e.g., a HDMI port) for sending signals to or receiving signals from an external device.

FIG. 14 is a block diagram illustrating the architecture of one aspect of a mobile computing device. That is, the mobile computing device 1300 can incorporate a system (e.g., an architecture) 1402 to implement some aspects. In one embodiment, the system 1402 is implemented as a "smart phone" capable of running one or more applications (e.g., browser, e-mail, calendaring, contact managers, messaging clients, games, and media clients/players). In some aspects, the system 1402 is integrated as a computing device, such as an integrated personal digital assistant (PDA) and wireless phone.

One or more application programs 1466 may be loaded into the memory 1462 and run on or in association with the operating system 1464. Examples of the application programs include phone dialer programs, e-mail programs, personal information management (PIM) programs, word processing programs, spreadsheet programs, Internet browser programs, messaging programs, and so forth. The system 1402 also includes a non-volatile storage area 1468 within the memory 1462. The non-volatile storage area 1468 may be used to store persistent information that should not be lost if the system 1402 is powered down. The application programs 1466 may use and store information in the non-volatile storage area 1468, such as e-mail or other messages used by an e-mail application, and the like. A synchronization application (not shown) also resides on the system 1402 and is programmed to interact with a corresponding synchronization application resident on a host computer to keep the information stored in the non-volatile storage area 1468 synchronized with corresponding information stored at the host computer. As should be appreciated, other applications may be loaded into the memory 1462 and run on the mobile computing device 1400, including instructions for providing and operating a focus session platform.

The system 1402 has a power supply 1470, which may be implemented as one or more batteries. The power supply 1470 might further include an external power source, such as an AC adapter or a powered docking cradle that supplements or recharges the batteries.

The system 1402 may also include a radio interface layer 1472 that performs the function of transmitting and receiving radio frequency communications. The radio interface layer 1472 facilitates wireless connectivity between the system 1402 and the "outside world," via a communications carrier or service provider. Transmissions to and from the radio interface layer 1472 are conducted under control of the operating system 1464. In other words, communications received by the radio interface layer 1472 may be disseminated to the application programs 1466 via the operating system 1464, and vice versa.

The visual indicator 1320 may be used to provide visual notifications, and/or an audio interface 1474 may be used for producing audible notifications via the audio transducer 1325. In the illustrated embodiment, the visual indicator 1320 is a light emitting diode (LED) and the audio transducer 1325 is a speaker. These devices may be directly coupled to the power supply 1470 so that when activated, they remain on for a duration dictated by the notification mechanism even though the processor 1460 and other components might shut down for conserving battery power. The LED may be programmed to remain on indefinitely until the user takes action to indicate the powered-on status of the device. The audio interface 1474 is used to provide audible signals to and receive audible signals from the user. For example, in addition to being coupled to the audio transducer 1325, the audio interface 1474 may also be coupled to a microphone to receive audible input, such as to facilitate a telephone conversation. In accordance with embodiments of the present disclosure, the microphone may also serve as an audio sensor to facilitate control of notifications, as will be described below. The system 1402 may further include a video interface 1476 that enables an operation of an on-board camera 1330 to record still images, video stream, and the like.

A mobile computing device 1400 implementing the system 1402 may have additional features or functionality. For example, the mobile computing device 1400 may also include additional data storage devices (removable and/or non-removable) such as, magnetic disks, optical disks, or tape. Such additional storage is illustrated in FIG. 14 by the non-volatile storage area 1468.

Data/information generated or captured by the mobile computing device 1400 and stored via the system 1402 may be stored locally on the mobile computing device 1400, as described above, or the data may be stored on any number of storage media that may be accessed by the device via the radio interface layer 1472 or via a wired connection between the mobile computing device 1400 and a separate computing device associated with the mobile computing device 1400, for example, a server computer in a distributed computing network, such as the Internet. As should be appreciated such data/information may be accessed via the mobile computing device 1400 via the radio interface layer 1472 or via a distributed computing network. Similarly, such data/information may be readily transferred between computing devices for storage and use according to well-known data/information transfer and storage means, including electronic mail and collaborative data/information sharing systems.

Figure 15:
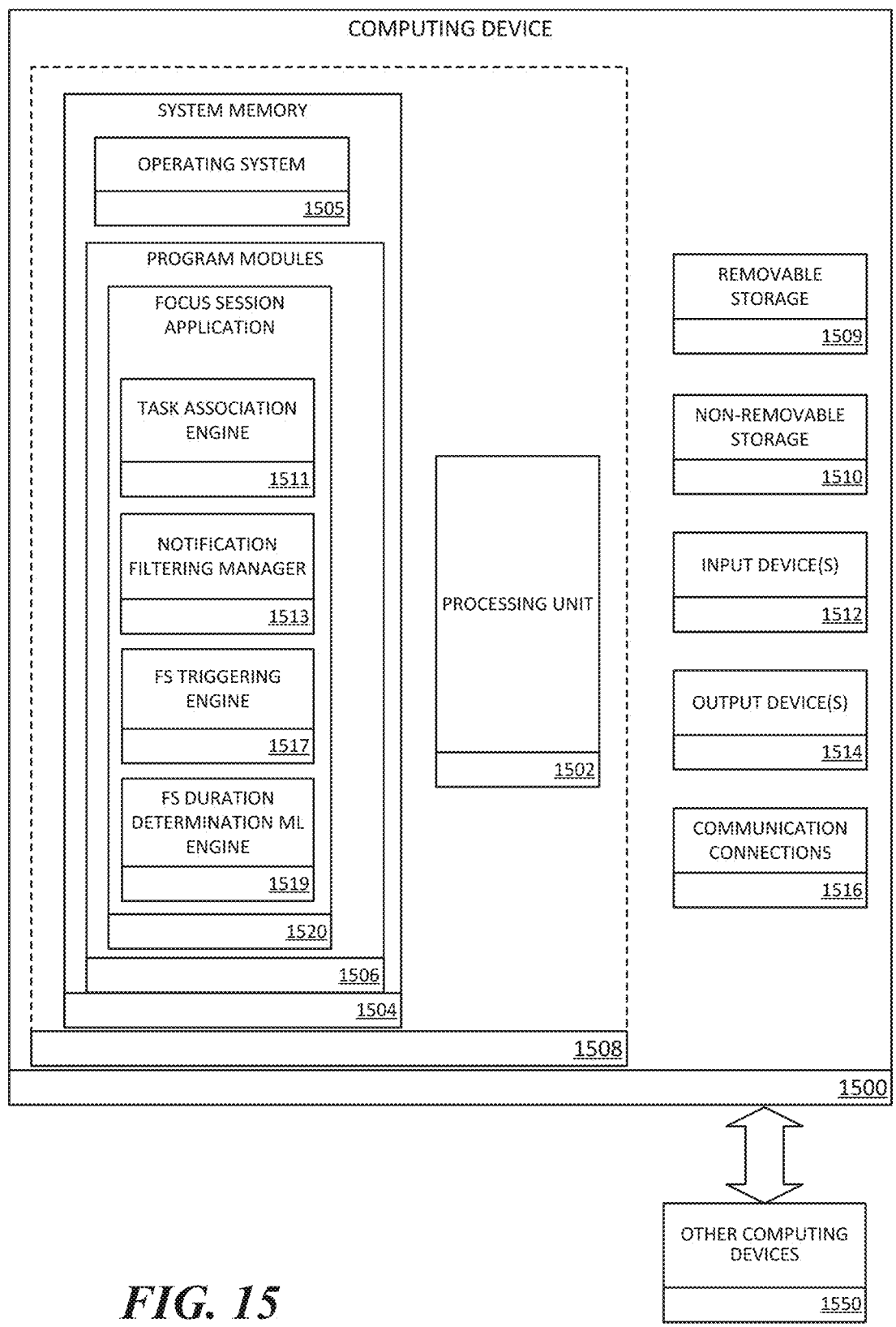
FIG. 15 is a block diagram illustrating example physical components of a computing device with which aspects of the disclosure may be practiced.

FIG. 15 is a block diagram illustrating physical components (e.g., hardware) of a computing device 1500 with which aspects of the disclosure may be practiced. The computing device components described below may have computer executable instructions for performing operations associated with a focus session service as described herein. In a basic configuration, the computing device 1500 may include at least one processing unit 1502 and a system memory 1504. Depending on the configuration and type of computing device, the system memory 1504 may comprise, but is not limited to, volatile storage (e.g., random access memory), non-volatile storage (e.g., read-only memory), flash memory, or any combination of such memories. The system memory 1504 may include an operating system 1505 suitable for running one or more application programs. The operating system 1505, for example, may be suitable for controlling the operation of the computing device 1500. Furthermore, embodiments of the disclosure may be practiced in conjunction with a graphics library, other operating systems, or any other application program and is not limited to any particular application or system. This basic configuration is illustrated in FIG. 15 by those components within a dashed line 1508. The computing device 1500 may have additional features or functionality. For example, the computing device 1500 may also include additional data storage devices (removable and/or non-removable) such as, for example, magnetic disks, optical disks, or tape. Such additional storage is illustrated in FIG. 15 by a removable storage device 1509 and a non-removable storage device 1510.

As stated above, a number of program modules and data files may be stored in the system memory 1504. While executing on the processing unit 1502, the program modules 1506 (e.g., focus session application 1120) may perform processes including, but not limited to, the aspects, as described herein. According to examples, task association engine 1511 may perform operations associated with associating a task object with a focus session. The task association may obtain task object data from a task management service via one or more APIs and or URIs for communicating with the task management service and/or for identifying a location of the correct task object. Task association engine 1511 may send the task management application data from the focus session that the task object is associated with and the task management service may update the task object based on that information. Notification filtering manager 1513 may perform operations associated with filtering electronic notifications during a focus session. Notification filtering manager 1513 may perform operations such as receiving an electronic notification from a first application; determining an electronic notification priority score for the electronic notification based on at least one of: the content of the electronic notification, a sender of the electronic notification, and an identity of the first application; determining that the electronic notification priority score for the electronic notification is below a threshold value; and blocking the electronic notification from being surfaced during the focus session. In some examples, the electronic notification priority score may be a combined priority score determined from a notification priority score an and application priority score. Focus session triggering engine 1517 may perform one or more operations associated with automatically triggering a focus session based on an electronic calendar object and a current time. Focus session duration determination engine 1519 may perform one or more operations associated with determining durations of times for users that are most suitable for focus sessions and/or breaks in focus sessions.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 15 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1500 may also have one or more input device(s) 1512 such as a keyboard, a mouse, a pen, a sound or voice input device, a touch or swipe input device, etc. The output device(s) 1514 such as a display, speakers, a printer, etc. may also be included. The aforementioned devices are examples and others may be used. The computing device 1500 may include one or more communication connections 1516 allowing communications with other computing devices 1550. Examples of suitable communication connections 1516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1504, the removable storage device 1509, and the non-removable storage device 1510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1500. Any such computer storage media may be part of the computing device 1500. Computer storage media does not include a carrier wave or other propagated or modulated data signal. Computer storage device does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 16:
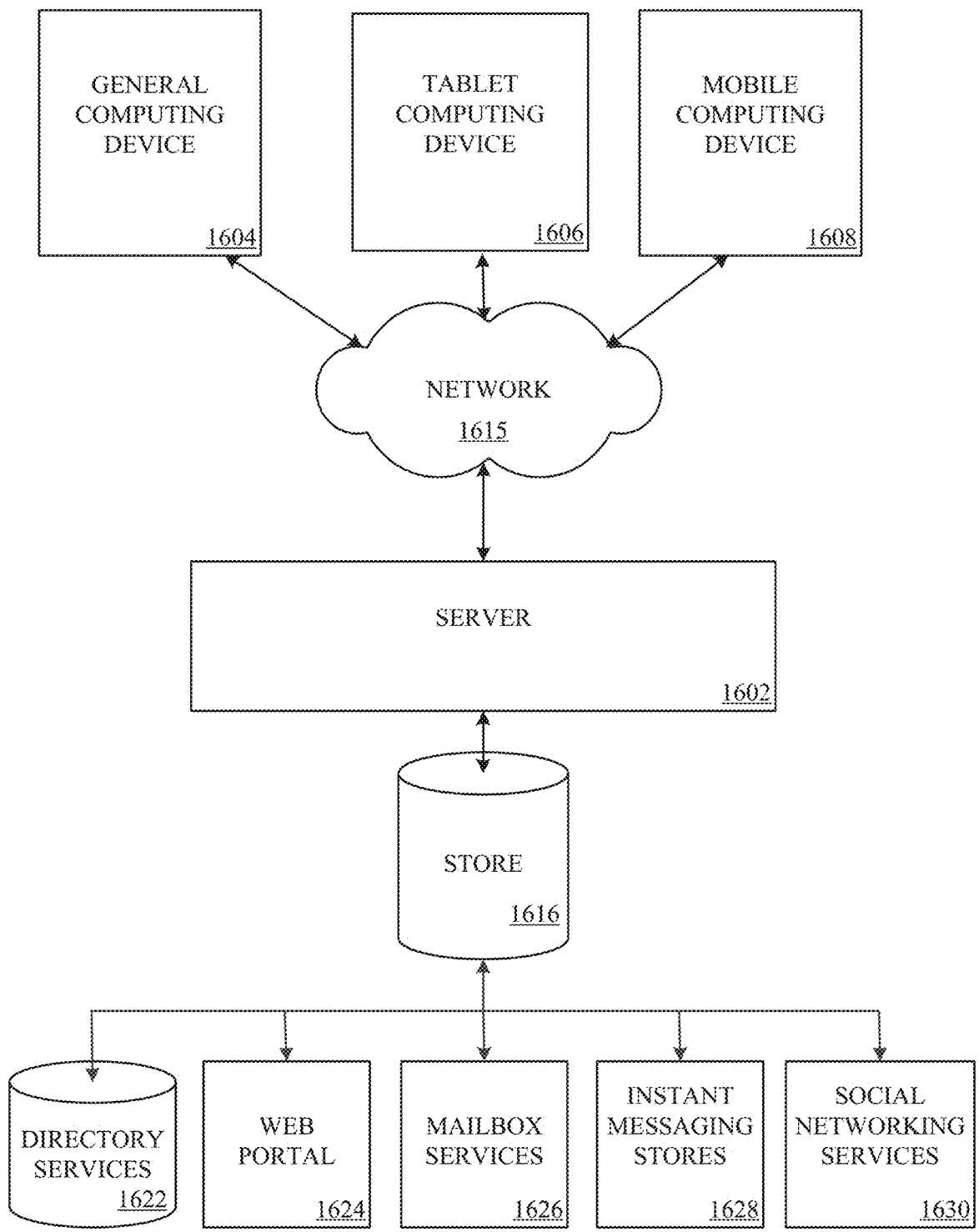
FIG. 16 is a simplified block diagram of a distributed computing system in which aspects of the present disclosure may be practiced.

FIG. 16 illustrates one aspect of the architecture of a system for processing data received at a computing system from a remote source, such as a personal/general computer 1604, tablet computing device 1606, or mobile computing device 1608, as described above. Content displayed at server device 1602 may be stored in different communication channels or other storage types. For example, various documents may be stored using a directory service 1622, a web portal 1624, a mailbox service 1626, an instant messaging store 1628, or a social networking site 1630. The program modules 1606 may be employed by a client that communicates with server device 1602, and/or the program modules 1606 may be employed by server device 1602. The server device 1602 may provide data to and from a client computing device such as a personal/general computer 1604, a tablet computing device 1606 and/or a mobile computing device 1608 (e.g., a smart phone) through a network 1615. By way of example, the computer systems described herein may be embodied in a personal/general computer 1604, a tablet computing device 1606 and/or a mobile computing device 1608 (e.g., a smart phone). Any of these embodiments of the computing devices may obtain content from the store 1616, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-readable storage device comprising executable instructions that, when executed by a processor, assists with managing a focus session, the computer-readable storage device including instructions executable by the processor for:

causing a focus session window to be displayed, wherein the focus session window comprises:
    a timer pane comprising a focus session duration input element,
    a task pane comprising an identity of at least one task object created by a task management application, and
    a music pane comprising an identity of a music playlist comprising one or more songs, wherein the timer pane, the task pane, and the music pane are simultaneously displayed;

receiving an input, at the focus session duration input element, of a duration of time;

receiving an indication to initiate a focus session; and initiating the focus session based on the received indication, the initiating comprising:
causing a timer for the duration of time to be initiated and displayed in the timer pane, and
causing the music playlist to be automatically played during the focus session for the duration of time.

2. The computer-readable storage device of claim 1, wherein the instructions are further executable by the processor for:
maintaining a focus session profile for a focus session user, wherein the focus session profile has a daily duration of focus session time goal associated with it.

3. The computer-readable storage device of claim 2, wherein the focus session window further comprises a daily progress pane that includes a goal display element indicating a duration of time spent in focus sessions for a current day in relation to the focus session time goal for the current day.

4. The computer-readable storage device of claim 1, wherein the instructions are further executable by the processor for:
receiving a selection of an identity of one of the at least one task object from the task pane;
associating a task object corresponding to the selected identity with the focus session; and
storing the duration of time corresponding to the focus session in a task fabric that includes the task object.

5. The computer-readable storage device of claim 4, wherein the instructions are further executable by the processor for:
determining a task type of the task object; and wherein initiating the focus session further comprises:
automatically opening, based on the determined task type, a first application window of a first application type, and a second application window of a second application type.

6. The computer-readable storage device of claim 1, wherein:
the identity of the music playlist included in the music pane corresponds to an automatically curated set of songs identified as being conducive for focusing; and
the identity of the music playlist is selectable for causing one or more songs from the music playlist to be automatically retrieved from a remote music service via an application program interface and one or more uniform resource indicators, and played during the focus session.

7. The computer-readable storage device of claim 1, wherein the instructions are further executable by the processor for:
maintaining an electronic notification filtering manager;
receiving, by the electronic notification filtering manager, an electronic notification from a first application;
determining, based on at least one of: content of the electronic notification, a sender of the electronic notification, and an identity of the first application, an electronic notification priority score for the electronic notification;
determining that the electronic notification priority score for the electronic notification is below a threshold value; and
blocking the electronic notification from being surfaced during the focus session.

8. The computer-readable storage device of claim 7, wherein the electronic notification was originally received by a smart phone connected to the computer readable storage device, and sent from the smart phone connected to the computer-readable storage device to the computer-readable storage device.

9. The computer-readable storage device of claim 1, wherein the instructions are further executable by the processor for:
determining that the duration of time is above a threshold duration; and
automatically inserting a break in the focus session.

10. The computer-readable storage device of claim 9, wherein the instructions are further executable by the processor for:
maintaining a focus session profile for a focus session user, and wherein the threshold duration is specific to the focus session user; and
determining the threshold duration of time, wherein determining the threshold duration of time comprises training a machine learning model on application data from one or more previous focus sessions for the focus session user.

11. The computer-readable storage device of claim 1, wherein the instructions are further executable by the processor for:
determining that a task object corresponding to the identity of the at least one task object in the task pane has a task type determined to take within a threshold number of minutes of the duration of time to complete;
surfacing a selectable recommendation to associate the task object with the focus session;
receiving a selection of the selectable recommendation;
associating the task object with the focus session; and
storing the duration of time corresponding to the focus session in a task fabric that includes the task object.

12. A system comprising:
a memory for storing executable program code; and
a processor, functionally coupled to the memory, the processor being responsive to computer-executable instructions contained in the program code and operative to:
maintain an electronic calendar object comprising:
a date,
a start time and duration of time on the date, and
a focus session designation;
determine that a current time is the start time;
initiate, based on determining that the current time is the start time, a focus session, wherein initiating the focus session comprises:
causing a focus session window to be displayed, wherein the focus session window comprises:
a timer pane,
a task pane comprising an identity of at least one task object created by a task management application, and
a music pane comprising an identity of a music playlist comprising one or more songs,
wherein the timer pane, the task pane, and the music pane are simultaneously displayed;
causing a timer for the duration of time to be initiated and displayed in the timer pane; and
causing the music playlist to be automatically played during the focus session for the duration of time.

13. The system of claim 12, wherein the processor is further responsive to the computer-executable instructions contained in the program code and operative to:

maintain a focus session profile for a focus session user, wherein the focus session profile has a daily duration of focus session time goal associated with it.

14. The system of claim 13, wherein the focus session window further comprises a daily progress pane that includes a goal display element indicating a duration of time spent in focus sessions for a current day in relation to the focus session time goal for the current day.

15. The system of claim 12, wherein the processor is further responsive to the computer-executable instructions contained in the program code and operative to:
receive a selection of an identity of one of the at least one task object from the task pane;
associate a task object corresponding to the selected identity with the focus session; and
store the duration of time corresponding to the focus session in a task fabric that includes the task object.

16. The system of claim 15, wherein the processor is further responsive to the computer-executable instructions contained in the program code and operative to:
maintain an electronic notification filtering manager;
receive, by the electronic notification filtering manager, an electronic notification from a first application;
determine, based on at least one of: content of the electronic notification, a sender of the electronic notification, and an identity of the first application, an electronic notification priority score for the electronic notification;
determine that the electronic notification priority score for the electronic notification is below a threshold value; and
block the electronic notification from being surfaced during the focus session.

17. A computer-implemented method comprising:
executing a task management software application;
displaying, in the task management software application, an identity of a task object;
receiving, in the task management software application, an indication to work on a task corresponding to the task object in a focus session;
automatically causing a focus session window to be displayed based on receiving the indication, wherein the focus session window comprises:
a timer pane, and
a music pane comprising an identity of a music playlist comprising one or more songs,
wherein the time pane and the music pane are simultaneously displayed;
initiating the focus session, wherein initiating the focus session comprises:
causing a timer for a specified duration of time to be initiated and displayed in the timer pane, and
causing the music playlist to be automatically played during the focus session for the specified duration of time; and
automatically associating the task object with the focus session.

18. The computer-implemented method of claim 17, further comprising:
determining a task type of the task object; and
automatically opening, based on the determined task type, a first application window of a first application type, and a second application window of a second application type.

19. The computer-implemented method of claim 17, further comprising:
maintaining a focus session profile for a focus session user, wherein the focus session profile has a daily duration of focus session time goal associated with it, and wherein the focus session window further comprises a daily progress pane that includes a goal display element indicating a duration of time spent in focus sessions for a current day in relation to the focus session time goal for the current day.

20. The computer-implemented method of claim 17, further comprising:
maintaining an electronic notification filtering manager;
receiving, by the electronic notification filtering manager, an electronic notification from a first application;
determining, based on at least one of: content of the electronic notification, a sender of the electronic notification, and an identity of the first application, an electronic notification priority score for the electronic notification;
determining that the electronic notification priority score for the electronic notification is below a threshold value; and
blocking the electronic notification from being surfaced during the focus session.

* * * * *